(12) United States Patent
Caratelli et al.

(10) Patent No.: US 9,716,319 B2
(45) Date of Patent: Jul. 25, 2017

(54) LENS ANTENNA, METHOD FOR MANUFACTURING AND USING SUCH AN ANTENNA, AND ANTENNA SYSTEM

(71) Applicant: THE ANTENNA COMPANY INTERNATIONAL N.V., Willemstad (CW)

(72) Inventors: Diego Caratelli, Rijswijk (NL); Johan Leo Alfons Gielis, Antwerpen (BE)

(73) Assignee: The Antenna Company International N.V., Willemstad (CW)

( * ) Notice: Subject to any disclaimer, the term of this patent is extended or adjusted under 35 U.S.C. 154(b) by 0 days.

(21) Appl. No.: 14/429,731

(22) PCT Filed: Mar. 15, 2013

(86) PCT No.: PCT/NL2013/050195
§ 371 (c)(1),
(2) Date: Mar. 19, 2015

(87) PCT Pub. No.: WO2014/046538
PCT Pub. Date: Mar. 27, 2014

(65) Prior Publication Data
US 2015/0236428 A1    Aug. 20, 2015

Related U.S. Application Data

(60) Provisional application No. 61/705,117, filed on Sep. 24, 2012.

(51) Int. Cl.
*H01Q 15/08* (2006.01)
*H01Q 19/06* (2006.01)
(Continued)

(52) U.S. Cl.
CPC ............. *H01Q 19/062* (2013.01); *H01Q 1/48* (2013.01); *H01Q 5/45* (2015.01); *H01Q 15/08* (2013.01);
(Continued)

(58) Field of Classification Search
CPC ........ H01Q 15/08; H01Q 19/062; H01Q 5/45; H01Q 1/48
See application file for complete search history.

(56) References Cited

U.S. PATENT DOCUMENTS 6,452,565 B1    9/2002  Kingsley et al.
7,570,219 B1    8/2009  Paulsen et al.
(Continued)

FOREIGN PATENT DOCUMENTS

EP    1536517    1/2005
WO    WO2004088793    10/2004
(Continued)

OTHER PUBLICATIONS

Kishk et al., Broadband dielectric resonator antennas excited by L-shaped probe, IEEE Transactions on Antennas and Propagation (Aug. 2006), 54(8): 2182-2189.
Simeoni, et al., "Plastic-Based Supershaped Dielectric Resonator Antennas for Wide-Band Applications", IEEE Transactions on Antennas and Propagation, 2011, 59(12): 4820-4825.

*Primary Examiner* — Hoang Nguyen
(74) *Attorney, Agent, or Firm* — Bret E. Field; Bozicevic, Field & Francis LLP

(57) ABSTRACT

The invention relates to a lens antenna. The invention also relates to an antenna system for transmitting and receiving electromagnetic signals comprising at least one antenna according to the invention. The invention further relates to a method of manufacturing an antenna according to the invention. The invention moreover relates to a method for use in wireless communications by using an antenna according to the invention. The invention additionally relates to a (Continued)

RF transceiver of a wireless communications device comprising at least one antenna according to the invention. The invention further relates to an electronic device comprising an RF transceiver according to the invention.

65 Claims, 9 Drawing Sheets

(51) Int. Cl.
  *H01Q 5/45* (2015.01)
  *H01Q 1/48* (2006.01)
(52) U.S. Cl.
  CPC .... *Y10T 29/49016* (2015.01); *Y10T 29/49018* (2015.01)

(56) References Cited

U.S. PATENT DOCUMENTS

| | | |
|---|---|---|
| 8,009,107 B2 * | 8/2011 | Li .................... H01Q 5/35 343/700 MS |
| 8,818,771 B2 | 8/2014 | Gielis et al. |
| 2005/0068251 A1 | 3/2005 | Ebling et al. |
| 2010/0220031 A1 | 9/2010 | Li et al. |

FOREIGN PATENT DOCUMENTS

| | | |
|---|---|---|
| WO | WO2005093905 | 6/2005 |
| WO | WO2011161548 | 12/2011 |

* cited by examiner

LENS ANTENNA, METHOD FOR MANUFACTURING AND USING SUCH AN ANTENNA, AND ANTENNA SYSTEM

The invention relates to a lens antenna. The invention also relates to an antenna system for transmitting and receiving electromagnetic signals comprising at least one antenna according to the invention. The invention further relates to a method of manufacturing an antenna according to the invention. The invention moreover relates to a method for use in wireless communications by using an antenna according to the invention. The invention additionally relates to an RF transceiver of a wireless communications device comprising at least one antenna according to the invention. The invention further relates to an electronic device comprising an RF transceiver according to the invention.

The increasing demand for data communications and connectivity has resulted in the development of innovative methods to satisfy current and emerging communication requirements. The path on which data travels from its source to its destination is described as a communications link. The primary sources of interference that effect wireless communication systems are electromagnetic in nature and can result in the magnetic and radio frequency disruption or intermittent failure of electronic, communication and information systems. The inherent physical, technical and mechanical design parameters associated with wired data links (i.e. fiber optic or cable) often offer a level of immunity from noise and interference sources. In addition, wired media has certain attributes that can limit the effect of noise and interference which adversely affect wireless data links. Wireless communication data links utilize free-space propagation and are subject to interference and signal disruption from a broad spectrum of sources. This represents one of the most significant challenges for designers of these systems, whereas it is difficult, and in some instances impossible, to isolate the transmission media from sources of electromagnetic and radio frequency interference. Wireless communications technologies utilize a broad range of the electromagnetic spectrum, to include high frequency, very high frequency, microwave, and optical transmission frequencies. The effects of noise and interference are different at different segments, or frequencies, of the electromagnetic spectrum. In order to address these concerns, significant consideration should be given to the design of wireless data link parameters that adequately address communication requirements and the issues related to signal interference and disruption. The consideration of potential interference sources during the design of these systems can offer considerable effects on data link connectivity, reliability, and data rates. The increased reliance on wireless networks data networks and wireless network segments introduces an additional vulnerability in relation to network operation and survivability. These wireless systems are subject to increased band congestion interference and the possibility introduction of an intentional interference source. The ability to transmit directed energy to critical wireless nodes can result in the temporary or permanent disruption of network connectivity and services. Additionally, with the recent advances in the wireless communications, the need for compact, low-profile, and high performance antennas has greatly increased. The greatest demand for these antennas is from personal communication systems (e.g. cellular telephones, pagers, mobile data systems and global positioning systems) and other mobile applications (e.g. automobiles, trains). Depending on applications, there are differences in antenna performance requirements (e.g. gain, bandwidth, polarization). However, compact and low-profile antennas are highly important for such applications, for either mechanical reasons or due to the miniaturization of electronic equipment in general. It is well known that, as the size of the antenna is reduced, the efficiency tends to degrade and the bandwidth becomes narrower. So, the conflicting nature of the requirements of high performance and compact size makes the design of these antennas very challenging. In addition, the interaction of the antenna with its complex environment also affects its performance. These environments may include the presence of the user's body or other complex structures.

It is an object of the present invention to provide an antenna with an improved efficiency and which can be shaped in a relatively compact manner.

In order to achieve this object, in the preferred embodiments of the invention, improved lens antennas for a wide class of wireless applications (including Wi-Fi networks) are invented. This improved lens antenna comprises: at least one electromagnetic lens, at least one ground plane connected to said lens, and at least one probing structure connected to said lens, said probing structure comprising at least two probes, wherein the mutual orientation of at least two probes is such that said probes are positioned at least partially out of the electromagnetic line of sight of each other. First of all, the use of a lens antenna has several advantages. In a lens antenna, the electromagnetic energy is transmitted away from the probing structure (feed system), hence, the emission aperture is not obstructed due to the probing structure. Moreover, in lens antennas, as the electromagnetic waves enter from one side and leaves out from the other, greater extent of wrapping and twisting is possible without disturbing the electrical path length, which leads to a high radiation efficiency. Furthermore, lens antennas can be shaped in a relatively compact manner. A further important advantage of lens antennas is that by selectively shaping (designing) the lens of the lens antenna both the internal (within the lens) radiation pattern and the emitted radiation pattern can be shaped in order to counteract interference as will be elucidated hereafter. Additionally, lens antennas can be easily integrated with planar circuitry. The use of multiple probes in a single lens antenna has the additional advantage that the transmitting and/or receiving capacity of the lens antenna will be improved in a relatively efficient manner, which moreover allows the antenna to act as multiband antenna. When identical antenna elements are placed in an array or multiple different antennas are used, they interact with each other. This interaction between elements due to their close proximity is called mutual coupling, which affects the input impedance as well as the radiation pattern. It is noted previously that multiple similar antenna probes can be implemented to either acquire higher gain with array structures or at least provide dual-polarization with two other antenna probes. Furthermore, in mobile station applications, even multiple different antenna probes can be used in a limited available space to provide multiband operation. For these kinds of antennas, the mutual coupling is simply defined as the interference value between two antenna probes, which is desired to be as low as possible. In order to counteract mutual coupling, in the lens antenna according to the invention the mutual orientation of at least two probes is such that said probes are positioned at least partially out of the electromagnetic line of sight of each other. Because the probes do not see each other, the electromagnetic interference within the lens is kept to a minimum. Positioning the probes out of the line of sight of each other can be realised, for example, by positioning at least one reflective element between the probes, wherein the at least one reflective element is preferably positioned such that a straight line between the probes is interrupted by the at least one reflective element. This facilitates an out of line positioning of the probes. The at least one reflective element can be a separate reflective element. This reflective element can be enclosed by the lens, wherein the reflective element in fact can be considered as a separate internal reflector. However, application of such a separate reflective element will commonly affect the efficiency of the antenna. It is therefore preferred that the electromagnetic radiation transmitted by at least one probe is at least partially reflected by at least one circumferential wall of the lens in a direction away from the at least one other probe. To this end, the circumferential wall of the lens is preferably at least partially concavely shaped which facilitates interruption of the line of sight of the probes. In some embodiments, the circumferential wall can be at least partially corrugated or otherwise profiled to propagate reflection of electromagnetic radiation transmitted by a probe in a direction away from the at least one other probe. In more particular embodiments, the circumferential wall can be both at least partially corrugated or otherwise profiled and at least partially concavely shaped to propagate reflection of electromagnetic radiation transmitted by a probe in a direction away from the at least one other probe.

The antenna according to the invention can be used to receive and/or to transmit electromagnetic radiation. The functionality of the probing structure therefore depends on the desired functionality of the antenna. It is thus thinkable that the probing structure is configured to receive and/or to transmit electromagnetic radiation. Commonly, the probing structure comprises at least one probe. The geometry, including the shape and dimensioning, of the probe is commonly completely dependent on the specific purpose and application of the antenna. Different types of probes can be used. A well known probe is a coaxially fed probe, which probe is at least partially accommodated within the lens, wherein the probe is thus at least partially surrounded by the lens. To this end, the lens is commonly provided with an accommodating space for accommodating the probe at least partially. The probe can also be formed by a waveguide which does not extend into the lens and merely connects to a base plane of the lens. In some embodiments, the probe can be formed by a microstrip which extends to a base plane of the lens. In yet an alternative embodiment, the probe is formed by a patch which is positioned between the ground plane and the lens. Application of a patch will commonly propagate generation of a spherical wave front and therefore a substantially homogenous power density distribution within the lens. Hence, different types of probes can be used in the lens antenna according to the present invention.

In case a single probe is used in the lens antenna, the antenna will be suitable to operate within a single designated frequency band. The frequency range of said frequency band completely depends on the application of the antenna. Currently, many mobile communication systems use several frequency bands such as GSM 900/1800/1900 bands (890-960 MHz and 1710-1990 MHz); Universal Mobile Telecommunication Systems (UMTS) and UMTS 3G expansion bands (1900-2200 MHz and 2500-2700 MHz); frequency bands in the microwave spectrum (1-100 GHz), in particular the $K_a$ band (26.5-40 GHz) and the $K_u$ band (12-18 GHz) used for satellite communication; and Wi-Fi (Wireless Fidelity)/Wireless Local Area Networks (WLAN) bands (2400-2500 MHz and 5100-5800 MHz). The lens antenna according to preferred embodiments of the invention is, however, not limited to the abovementioned enumeration of well-known frequency bands.

Conventionally, because a single antenna cannot operate at all of these frequency bands of mobile communication, multiple different antennas covering these bands separately could be used. However, usage of many antennas is usually limited by the volume and cost constraints of the applications. Therefore, multiband and wideband antennas are essential to provide multifunctional operations for mobile communication. A multiband antenna in a mobile communication system can be defined as the antenna operating at distinct frequency bands, but not at the intermediate frequencies between bands. To this end, it is preferred that the probing structure comprises multiple probes leading to multiple antenna ports. The operation of these probes can be reconfigurable. In recent years, a growing effort has been devoted by the industrial and scientific research communities in the development of reconfigurable antennas. This interest is pushed by the need for versatile front-ends in future microwave systems, which will support an ever growing number of functionalities such as radars, communication, direction and spectrum "sniffing" or control. Moreover, personal wireless or vehicle-to-vehicle communication devices must typically support a large number of standards (e.g., UMTS, Bluetooth, Wi-Fi, WiMAX, DSRC). A reconfigurable antenna can reuse its volume at different frequency bands so that a portion of or the entire structure is involved in a specific mode of operation. Antenna reconfigurability in conventional front-end architectures can be achieved by changing the state of suitable switching devices in order to optimize the performance of the device for application in different operative scenarios. Several approaches have been proposed for implementing this concept. Most of these approaches rely on either solid-state or electromechanical switches. The former includes switches based on PIN diodes, varactors or field-effect transistors (FETs), whereas the latter includes simple relays and a number of different types of micro-electromechanical-system (MEMS). In the proposed multi-port supershaped antenna concept, suitable solid-state tuning circuits connected to the input terminals of the antenna are used to dynamically adjust the relevant circuital characteristics, such as frequency of operation, and/or radiation properties. The device reconfigurability is technically achieved by changing the feeding/loading condition at the input ports and, thereby, the current distribution within the antenna structure.

The adopted multiple feeding mechanism, allowing for an easy wide-range tuneability of the antenna performance, has to be optimized in such a way as to minimize the level of spurious electromagnetic coupling between the antenna ports (probes), potentially resulting in a degradation of the device performance. In this context, it is actually to be stressed that the considered device is in fact acting as an antenna at those frequencies where the input power reflection level is not perfectly compensated by the transmission coefficients between the different ports. The natural resonant processes affecting the antenna characteristics can be activated or inhibited by properly tuning the loading impedances $Z_i$ at the input ports i=0, 1, . . . , N, N being the number of antenna feeds. In doing so, particular attention should be put on the radiation efficiency $\eta(Z_i)$ of the device in such a way as to maximize the input power into a radio-wave signal headed in a desired spatial direction. In this respect, it is straightforward to show that the power radiated by the antenna, regarded as a N-port network, can be easily expressed in terms of the incident and reflected wave vectors, $a=a(Z_i)$ and $b=b(Z_i)$ respectively, as follows:

$$P_n = \tfrac{1}{2}(\|a\|^2 - \|b\|^2) = \tfrac{1}{2} a^H \cdot Q \cdot a, \qquad (1)$$

where the superscript $^H$ denotes Hermitian transposition, and:

$$Q = 1 - S^H \cdot S \quad (2)$$

is the so-called dissipation matrix, $1$ being the usual unit dyadic. In order to facilitate the analysis and optimization of the device, while gaining a useful insight in the physical mechanisms responsible for the relevant circuital behaviour, a singular-value-decomposition-based representation of the S-parameters is adopted. This factorization is given by:

$$S = U \cdot \Sigma \cdot V^H \quad (3)$$

where $U$ and $V$ are unitary matrices of left and right singular vectors, respectively, and $\Sigma$ is the diagonal matrix of corresponding ordered singular values $\sigma_n$. As a consequence, the S-matrix relation $b = S \cdot a$ can be conveniently written as:

$$\underbrace{U^H \cdot b}_{b'} = \Sigma \cdot \underbrace{V^H \cdot a}_{a'} \quad (4)$$

Upon considering the normalized wave vectors $a' = V^H \cdot a$ and $b' = U^H \cdot b$, the device behaviour can be described as the superposition of the natural responses of decoupled one-port junctions, where the n-th junction presents a positive reflection coefficient $\sigma_n$. Thus, one can readily infer that the circuital characteristics, as well as the radiation properties of the antenna are primarily defined by the singular values of the relevant scattering matrix. As a matter fact, by combining (1) and (2) with (4), the expression of the termination-dependent radiation efficiency is found to be, after some algebra:

$$\eta = \frac{P_R}{P_{in}} \quad (5)$$
$$= \frac{a^H \cdot Q \cdot a}{a^H \cdot a}$$
$$= \frac{\sum_n (1 - \sigma_n^2) |a'_n|^2}{\sum_n |a'_n|^2},$$

where $P_{in} = \frac{1}{2} \|a\|^2 - \frac{1}{2} \|a'\|^2$ denotes the power accepted at the terminals of the structure. Therefore, the optimal antenna operation is clearly achieved by minimizing the singular values $\sigma_n$. In this way, the optimal loading condition $Z_i$ ($i = 0, 1, \ldots, N$) of the input ports can be selected for proper antenna operation at the frequency bands of interest.

In some embodiments, these antennas can also be used in arrays, not only planar arrays but also in tailored 3D arrays, based on 3D supershapes. The considered class of lens antennas can be optimized for the design of inexpensive arrays for next-generation wireless radar, space applications with demanding requirements in terms of impedance matching and radiation properties. In this context, the adoption of non-uniformly spaced planar arrays is envisaged. Proper shaping of the radiation pattern with a reduced number of antenna elements leads to reduced weight, cost, and complexity of the feeding network. A larger average inter-element distance results in a smaller parasitic antenna coupling level. Due to the aperiodic spacing, no replicas of the antenna main lobe occur in the visible space, even where pattern scanning is performed. In the beam-forming for the proposed array configuration, both amplitude and phase of each antenna element are to be controlled. Combined amplitude and phase control can be used to adjust side lobe levels and steer nulls better than can be achieved by phase control only.

In order to provide the lens antenna the desired multiband functionality it is desired to make the geometry of at least two probes mutually different. As already mentioned before, the geometry includes both the shape and the dimensioning of the probes. By applying different geometries of the different probes different radiation characteristics can be obtained which easily leads to the desired multiband functionality. The preferred length of the probe is dependent on both the material of the lens, in particular the dielectric constant of the material of the lens, and the desired frequency or frequency band. As an example it is mentioned that in case a polymer lens, in particular a lens made of polyvinylchloride (PVC), is used which should operate in the 5 GHz frequency band for application in a wireless local area network (WLAN), the length of the probe is preferably between 4 and 8 mm. In case another probe (of the same antenna) would be configured to operate in the 2.4 GHz frequency band, the length of said probe would preferably be between 10 and 18 mm. The diameter of the at least one probe is preferably situated between 1 and 3 mm.

As already mentioned above, the lens antenna according to the invention can be dimensioned relatively compactly if compared to conventional antennas. The height of the lens is preferably smaller than or equal to 5 cm which will commonly sufficient to allow proper functioning of the lens antenna according to the invention.

The lens is preferably at least partially made of a dielectric material, more preferably a dielectric material having a dielectric constant of between 2 and 90. By choosing a material having a relatively high dielectric constant, the size of the lens can be reduced significantly. It is possible that the lens is at least partially made of at least one ceramic. Dielectric constants (e) of ceramics span from 4.5 to 100. Dielectrics with $\in$ ranging from 4.5 to about 6 are typically based on magnesium aluminum silicate and magnesium silicate compounds, respectively. Dielectrics with $\in$ in the 13 to 16 range are based on the compounds $Mg_2TiO_4$ and $MgTiO_3$. Several routes can be followed to obtain low loss ceramics with $\in$>16. $CaTiO_3$ shows relatively modest loss but has a high $\in$ (150-160) and a very large, negative temperature coefficient of $\in$ (about $-1600$ ppm/° C.). In turn, $CaTiO_3$ is chemically compatible with both $Mg_2TiO_4$ ($\in$~13) and $MgTiO_3$ ($\in$~16). Note that the magnesium titanates have moderately positive temperature coefficients of $\in$. Thus, composite ceramics composed of $Mg_2TiO_4$ plus $CaTiO_3$ can cover $\in$ from 13 to about 150 at any desired value while composites of $MgTiO_3$ plus $CaTiO_3$ cover almost the same range, 16 to about 150. Low loss ceramics covering $\in$ from about 37 to about 100 also can be produced from barium titanates. Typically, the low end of the series is the compound, $BaTi_4O_9$. Small increases in the $TiO_2$ content yield $BaTi_4O_9/Ba_2Ti_9O_{20}$ ceramic composites or pure $Ba_2Ti_9O_{20}$. However, the $\in$ remains in the 37-39 range and temperature coefficient of $\in$ remains very small but slightly negative. The region, $\in$·3 9-100, is characterized by ceramics consisting of $Ba_2Ti_9O_{20}$ plus $TiO_2$. Both $\in$ and temperature coefficient of $\in$ rapidly rise in magnitude with increasing $TiO_2$ ($\in$=100) content. It has been found that ceramics with relatively low dielectric constants from 4.5 to 10 are commonly most suitable to be used as lens material.

However, in some embodiments, which are often favourable, the lens is at least partially made of glass, in particular Pyrex® (a clear, low-thermal-expansion borosilicate glass commercially available from Corning Incorporated), crystal, silica (silicon dioxide), ferroelectric dielectric materials, liquid crystals, at least one polymer, in particular polyvinylchloride (PVC), polystyrene (PS), polyimide (PI), a bioplastic (a plastic derived from renewable biomass sources, such as vegetable fats and oils, corn starch, pea starch or microbiota), or fluoroplastics; and/or a metal oxide, in particular titanium oxide, aluminium oxide, barium oxide, or strontium oxide. In particular, the application will commonly be prepared both from a financial point of view and from a design point of view. Polymers are relatively cheap, and moreover easy to shape using conventional moulding, extrusion and/or thermoforming techniques, and can even be shaped by way of 3D printing which provides a significant freedom of design. In this context, in some embodiments one can apply a lens comprising a shell which is at least partially made of at least one glass, crystal, and/or at least one polymer enclosing at least one inner space which is at least partially filled with a fluid, preferably air or demineralised water (acting as dielectric). The application of air and water will reduce the quantity of other materials used which will further reduce the cost price of the lens and therefore of the antenna according to the invention. The lens can be a dielectric resonator leading to a dielectric resonator antenna (DRA). Electromagnetic radiation are introduced as radio waves into the inside of the resonator material from a transmitter circuit, wherein the waves bounce back and forth between the resonator walls, forming standing waves. The walls of the resonator are partially transparent to radio waves, allowing the radio power to radiate into space. These resonating lenses thus lack metal parts, which would affect the energy dissipation within the lens, and therefore have lower losses and are more efficient than conventional metal antennas.

In the preferred embodiments of the invention, the improved lens antenna comprises: at least one electromagnetic lens, at least one ground plane connected to said lens, and at least one probing structure connected to said lens, wherein at least one of the at least one electromagnetic lens and the at least one ground plane having at least one base profile is substantially supershaped, wherein said supershaped base profile is defined by the polar function:

$$\rho_d(\varphi) = \frac{1}{\sqrt[n_1]{\left|\frac{1}{a}\cos\frac{m_1}{4}\varphi\right|^{n_2} + \left/ -\left|\frac{1}{b}\sin\frac{m_2}{4}\varphi\right|^{n_3}\right.}}$$

$a, b \in \mathbb{R}^+$; $m_1, m_2, n_1, n_2, n_3 \in \mathbb{R}$, $a, b, n_1 \neq 0$
and wherein:
  $\rho_d(\varphi)$ is a curve located in the XY-plane; and
  $\varphi \in [0, 2\pi)$ is the angular coordinate.

Despite of the fact that the proposed antennas are extremely simple to construct, easily machinable and thus cheap, they surprisingly considerably outperform antennas currently used in wireless communications in terms of operational bandwidth, maximum gain, and radiation pattern agility. Furthermore, the considered antennas use sustainable technology and are ecologically friendly. In particular, the geometry of a base profile of the lens and/or ground plane is defined by the polar equation known in the scientific literature as superformula (or Gielis' formula) and its generalization to three-dimensional spaces. The superformula is explained in detail in U.S. Pat. No. 7,620,527 to J. Gielis, the entire disclosure of which is incorporated herein by reference. In addition, the present application also incorporates by reference the entire disclosure of U.S. Provisional Application No. 61/356,836 entitled Computer Implemented Tool Box to Johan Gielis, filed on Jun. 21, 2010, the entire contents of which is incorporated herein by reference as though recited herein in full. Furthermore, the present application also incorporates by reference the entire disclosure of U.S. patent application Ser. No. 13/165,240 entitled Computer Implemented Tool Box to Johan Gielis, filed on Jun. 22, 2011, the entire contents of which is incorporated herein by reference as though recited herein in full. The '527 patent describes systems and methods by which patterns (e.g., such as images, waveforms such as sounds, electromagnetic waves, or other signals, etc.) are synthesized, modulated and/or analyzed through the use of a computer programmed with a novel mathematical formula. The formula can be used to create a variety of shapes, waveforms, and other representations. The formula greatly enhances ability in computer operations and provides a great savings in computer memory and a substantial increase in computing power.

The geometric concept of the '527 patent is useful for modeling and for explaining why certain natural shapes and forms grow as they do. As explained in the '527 patent, the inventor therein found that most geometrical forms and regular shapes, including circles and polygons, can be described as special realizations of the following formula:

$$\rho_d(\varphi) = \frac{1}{\sqrt[n_1]{\left|\frac{1}{a}\cos\frac{m_1}{4}\varphi\right|^{n_2} + \left/ -\left|\frac{1}{b}\sin\frac{m_2}{4}\varphi\right|^{n_3}\right.}}$$

$a, b \in \mathbb{R}^+$; $m_1, m_2, n_1, n_2, n_3 \in \mathbb{R}$, $a, b, n_1 \neq 0$ The '527 patent explains how this formula and representations thereof can be utilized, for example, in both the "synthesis" and "analysis" of patterns (i.e., including for example image patterns and waveforms such as electromagnetic (e.g., electricity, light, etc.), sound and other waveforms or signal patterns) and the like.

In order to synthesize various patterns, the parameters in this equation can be modified so that a variety of patterns can be synthesized. Notably, the parameters appearing in the equations above can be moderated. By moderating or modulating the number of rotational symmetries (m), exponents ($n_1$-$n_3$), and/or short and long axes (a, b), a wide variety of natural, human-made and abstract shapes can be created in two and three-dimensional space.

In FIG. 1 of the '527 patent a schematic diagram is shown showing various components that can be included in various embodiments for the synthesis of patterns and/or for the analysis of patterns with the super-formula operator. As described in the '527 patent, according to the first aspect, for illustrative purposes with reference to said FIG. 1, shapes or waves can be "synthesized" by the application of the following exemplary basic steps: In a first step, a choice of parameters is made (e.g., by either inputting values into the computer 10, i.e., via a keyboard 20, a touch screen, a mouse-pointer, a voice recognition device or other input device or the like, or by having the computer 10 designate values), and the computer 10 is used to synthesize a selected super-shape based on the choice of parameters. In a second optional step, the super-formula can be used to adapt the selected shapes, to calculate optimization, etc. This step can include use of: graphics programs (e.g., 2D, 3D, etc.); CAD software; finite element analysis programs; wave generation programs; or other software. In a third step, the output from the first or second step is used to transform the computerized super-shapes into a physical form, such as via: (a) displaying the super-shapes 31 on a monitor 30, printing the super-shapes 51 upon stock material 52 such as paper from a printer 50 (2-D or 3-D); (b) performing computer aided manufacturing (e.g., by controlling an external device 60, such as machinery, robots, etc., based on the output of step three); (c) generating sound 71 via a speaker system 70 or the like; (d) performing stereo lithography; (e) performing rapid prototyping; and/or (f) utilizing the output in another manner known in the art for transforming such shapes.

The '527 patent discusses both synthesis (such as, e.g., creation of shapes) and analysis (such as, e.g., the analysis of shapes). With respect to analysis, the '527 patent explains that: "In general, although not limited thereto, shapes or waves can be "analyzed" by the application of the following basic steps (these steps have similarities to the foregoing steps in synthesis in reverse): In a first step, a pattern can be scanned or input into a computer (e.g., in a digital form). For example, an image of an object can be scanned (2-D or 3-D), a microphone can receive sound waves, or electrical signals (e.g., waves) can be input, data from a computer readable medium such as, e.g., a CD-ROM, a diskette, an internal or external flash drive etc., can be input, data can be received on-line, such as via the Internet or an Intranet, etc. Various other known input techniques could be used, such as, for example, using digital or other cameras (e.g., whether single picture or continuous real time, etc.), etc. [FIG. 1] illustrates examples wherein an image scanner 100 (e.g., a document scanner utilized to scan images on stock material such as paper or photographs, or another scanner device) and/or a recorder 200 (e.g., which receives waveforms via a microphone or the like) are utilized in conjunction with the computer 10. In a second step, the image is analyzed to determine parameter values, etc, of the super-formula. In this step, the analyzed signals could also be identified, categorized, compared, etc. In some computer analysis cases, the computer can include a library or catalogue (e.g., stored in a memory) of primitives (e.g., categorizing assorted supershapes by parameter values). In such latter cases, the computer can then be used to approximate, identify, classify and/or the like the supershapes based on the information in the library or catalogue. The catalogue of primitives could be used, for example, for the first approximation of patterns or shapes. In a third optional step, the analyzed signals can be moderated as desired (e.g., operations can be performed similar to that described above with reference to the second general phase or step of synthesis). In a fourth step, an output can be created. The output can include: (a) providing a visual (e.g., displayed or printed) or an audible (e.g., sound) output; (b) controlling the operation of a particular device (e.g., if certain conditions are determined); (c) providing an indication related to the analyzed pattern (e.g., identifying it, classifying it, identifying a preferred or optimal configuration, identifying a defect or abnormality, etc.); (d) creating another form of output or result as would be apparent to those in the art. In the analysis, after the pattern is digitized, the computer proceeds using a certain type of representation. If it is a chemistry pattern, the XY graph should be selected. If it is a closed shape, a modified Fourier analysis should be selected. The computer should be adapted (e.g., via software) to provide an estimation of the right parameters for the equation to represent the digitized pattern.

The above superformula provides the capability for unified description of natural and abstract shapes ranging from elementary particles to complex generalized Lame curves. The improved antenna according to embodiments of the invention allows an increased number of degrees of freedom for the design, paving the way towards a wide variety of radiating structures and sensors with tunable electromagnetic characteristics.

In this context, the proposed supershaped lens antennas provide clear advantages in reason of their reduced losses (virtually no metal loss), high radiation efficiency and ease of integration with planar circuitry. Furthermore, they offer a high degree of flexibility and versatility over a wide frequency range, allowing for the designer to suit various requirements. Numerical investigations and measurements performed on an experimental prototype complying to the upcoming WiMedia standard confirm that the considered antennas are able to operate over very wide frequency bands (exceeding 70%) while maintaining stable radiation patterns and gain values. On the basis of the achieved results, we can conclude that the proposed antennas can find application as access points for indoor multimedia radio systems, and wherever broad, smooth and stable-over-frequency radiation patterns are desirable, this being particularly important in the emerging low-cost applications of radar, wireless and satellite technology.

In fact, every lens antenna comprises a lens and/or ground plane having a three-dimensional shape. It can be favourable that multiple base profiles of the lens and/or ground plane are substantially supershaped, wherein each supershaped base profile is defined by the polar function (superformula) according to claim 1. In this manner three-dimensional a supershaped lens and/or supershaped ground plane will be created, which will commonly be in favour of the power distribution pattern and intensity of the lens antenna as such. In these three-dimensional supershaped component, commonly firstly a first base profile is defined according to the superformula according to claim 1, and at least one further base profile is defined according to the superformula according to claim 1. Both base profiles commonly define a cross-section of the final supershape, o—in other words—the first base profile defines a profile while the other base profile defines a path along which this first base profile is rotated. Hence, the three-dimensional shape can be the result of a superposition of multiple two-dimensional shapes. For example, square base profile combined with a triangular base profile leads to a pyramid shape, while a teardrop shaped base profile combined with a rectangular base profile leads to a wing shape. In this manner, an infinite number of three-dimensional supershapes can be created. The three-dimensional shape can also be the result of combining outer surface faces, each face complying with the superformula according to claim 1. For example, a dodecaeder has pentagon shaped faces, wherein each pentagon complies with the two-dimensional superformula according to claim 1. The same applies, for example, to a icosaeder, wherein each distinctive face is defined by a triangle complying with the superformula.

The parametric representation of the three-dimensional shape of the lens and/or ground plane is based on two perpendicular cross sections $\rho_1(\theta)$ and $\rho_2(\phi)$ $$\begin{cases} x = \rho_1(\vartheta)\cos\vartheta \cdot \rho_2(\varphi)\cos\varphi \\ y = \rho_1(\vartheta)\sin\vartheta \cdot \rho_2(\varphi)\cos\varphi \\ z = \rho_2(\varphi)\sin\varphi \end{cases}$$

wherein:
$\rho$ is defined by the function presented in claims 1,
$0 \leq \theta \leq 2\pi$, and
$-\frac{1}{2}\pi \leq \phi \leq \frac{1}{2}\pi$.

Written as a polar function, the three-dimensional shape of the lens and/or the ground plane can also be defined as:

$$\rho_d(\varphi, \vartheta) = \frac{1}{\sqrt[l_1]{\left|\frac{1}{c}\cos\frac{m_1}{4}\varphi\right|^{l_2} + \left/-\left|\frac{1}{d}\sin\frac{m_2}{4}\varphi\right|^{l_3}\right.}}$$ wherein:

$$c = \frac{1}{\sqrt[n_1]{\left|\frac{1}{a}\cos\frac{m_3}{4}\vartheta\right|^{n_2} + \left/-\left|\frac{1}{b}\sin\frac{m_4}{4}\vartheta\right|^{n_3}\right.}}$$

and wherein:
a, b, c, d>0; a, b, c, d, $l_1, l_2, l_3, m_1, m_2, m_3, m_4, n_1, n_2, n_3$) ∈ ℜ and $n_1, l_1 \neq 0$
$0 \leq \theta \leq 2\pi$, and
$-\frac{1}{2}\pi \leq \phi \leq \frac{1}{2}\pi$.

The above polar function can be rewritten is spherical coordinates as:

$$\rho_d(\vartheta, \varphi) = \left(\left|\frac{\sin\frac{p\vartheta}{2}\cos\frac{q\varphi}{4}}{\gamma_1}\right|^{v_1} + \left|\frac{\sin\frac{p\vartheta}{2}\sin\frac{q\varphi}{4}}{\gamma_2}\right|^{v_2} + \left|\frac{\cos\frac{p\vartheta}{2}}{\gamma_3}\right|^{v_3}\right)^{-\frac{1}{v_0}}$$

wherein:
p and q are symmetry parameters;
$\gamma_1, \gamma_2, \gamma_3$ are analogous to the parameters a and b as identified above;
$v_0, v_1, v_2, v_3$ are analogues to the parameters $n_0, n_x, n_y$ (or $n_0, n_1, n_2$)
(p, q, $v_1, v_2, v_3$) ∈ ℜ ;
($\gamma_1, \gamma_2, \gamma_3, v_0$) ≥ 0;
$0 \leq \theta \leq \pi$; and
$0 \leq \phi \leq 2\pi$.

Preferably, the design of a supershaped lens antenna, in particular a dielectric resonator antenna (SDRA), is carried out by assimilating it to an ordinary cylindrical dielectric resonator antenna. First, the lens base effective radius is defined as:

$$\rho_e = \sqrt{\frac{1}{2\pi}\int_0^{2\pi}\rho_d^2(\varphi)\,d\varphi}$$

where $\rho_d(\phi)$ is given by the Gielis' equation:

$$\rho_d(\varphi) = \left(\left|\frac{1}{a}\cos\frac{m_1}{4}\varphi\right|^{n_2} + \left/-\left|\frac{1}{b}\sin\frac{m_2}{4}\varphi\right|^{n_3}\right.\right)^{-\frac{1}{n_1}}$$

which describes a base profile of the lens, in particular of the lens base. On the other hand, the lens height ($h_d$) is chosen to be about a wavelength in the dielectric material at the central operating frequency of the antenna ($f_c$), that is:

$$h_d \simeq \frac{c_0}{f_c\sqrt{\varepsilon_r}}$$

with $c_0$ being the speed of light in vacuum, and where ∈r denotes the relative permittivity of the material forming the lens. In order to achieve wide frequency bands of operation, the cross-sectional dimensions of the lens are set so that the following aspect ratio is obtained:

$$\chi = \frac{\rho_e}{h_d} = 0.4$$

The location and the length of the probe are heuristically determined by full-wave analysis.

In a preferred embodiment the electromagnetic lens, in particular formed by the ground surface or bottom surface of the lens (commonly parallel to the ground plane), and/or the ground plane has at least one base profile, which is substantially supershaped, wherein m≥4. This parameter condition leads to unconventional symmetric shape of the lens including sharp edges which results in a more symmetric spatial power density distribution if compared to the case of a cylindrically shaped lens, wherein for one base profile counts that m=0. In this manner, electromagnetic radiation can be radiated in multiple focused directions. The presence of sharp edges does necessarily not reduce the radiation efficiency of the preferred antenna. A further preferred boundary condition is that a≠b, and preferably that at least one value of $n_x$, $n_y$, and $n_0$ deviates from 2. Also these boundary conditions lead to unconventionally shaped lens. This allows it to position the probes in the (circumferential) sharp edges of the lens to minimize mutual interference of the probes. The probe can be accommodated at least partially within an accommodating space of the lens. The positioning of these accommodating spaces is preferably such that the probes will be positioned out of the line of sight of each other.

The ground plane can either be flat or non-planar, such as curved and/or angulated. In some embodiments, both the lens and the ground plane, together forming a so-called transducer, have a base profile which complies to the superformula as stated above. It is also contemplated that in some embodiments that the ground plane and the lens have equivalent shapes, or base profiles with an equivalent shape. However, in some embodiments that the shape of the ground plane can be completely different from the shape of the lens, provided that at least one base profile of at least one of the ground plane and the lens complies with the superformula as formulated in claim 1.

Preferably, the substantially supershaped base profile is a base profile of the lens which extends in a direction which is substantially parallel to a plane defined by the ground plane. This will commonly lead to an axis of symmetry of the lens which is oriented perpendicular to a (central) plane defined by the ground plane which is in favour of the spatial power density distribution. This embodiment allows the application of a lens having the (unconventional) shape of a polyhedron, such as a prism, wherein an n-sided polygonal base of the polyhedron is directed towards and eventually mounted onto the ground plane.

In a preferred embodiment, a surface of the ground plane directed towards the lens is at least partially reflective. The ground plane could be flat or curved (cup-shaped or bowl-shaped) and comprises an electrically conducting surface to reflect the electromagnetic radio waves from other antenna elements. The plane does not necessarily have to be connected to ground. Commonly to function as a ground plane, the conducting surface must be at least a quarter of the wavelength (λ/4) of the radio waves in size. For higher frequency antennas, in the VHF or UHF range, the ground plane can be formed e.g. by a metal disc or a screen. At upper VHF and UHF frequencies, the metal skin of a car or aircraft can serve as a ground plane for whip antennas projecting from it. The ground plane doesn't have to be a continuous surface. In the ground plane antenna the "plane" consists of several wires λ/4 long radiating from the base of a quarter wave whip antenna. The radio waves from the lens (or from another antenna) that reflect off a ground plane appear to come from a mirror image of the antenna located on the other side of the ground plane. In a monopole antenna, the radiation pattern of the monopole plus the virtual "image antenna" make it appear as a two element centre-fed dipole antenna. So a monopole mounted over an ideal ground plane has a radiation pattern identical to a dipole antenna. The feed line from the transmitter or receiver is connected between the bottom end of the monopole element and the ground plane. The ground plane preferably has good conductivity; any resistance in the ground plane is in series with the antenna, and serves to dissipate power from the transmitter. The ground plane could be combined with a printed circuit board (PCB). This serves to make circuit design easier, allowing the designer to ground any component without having to run additional copper traces; component copper wire needing grounding is routed directly through a hole in the board to the ground plane on another layer. The large area of copper also conducts the large return currents from many components without significant voltage drops, ensuring that the ground connection of all the components are at the same reference potential. However, for this specific purpose, the major reason for using large ground planes is commonly to reduce electrical noise and interference being coupled from one part of the circuit to another through the ground (ground loops), and crosstalk between adjacent circuit traces.

When digital circuits switch state large current pulses flow from the integrated circuits through the ground circuit. If the power supply and ground wires have significant resistance, the voltage drop across them can create noise voltage pulses in the ground wires, which are applied to other parts of the circuit. The large capacitance of the ground plane allows it to absorb the current pulses without much change in voltage. In addition, a ground plane under printed circuit traces can reduce crosstalk between adjacent traces. When two traces run parallel, an electrical signal in one can be coupled into the other through electromagnetic induction by magnetic field lines from one linking the other; this is called crosstalk. When a ground plane layer is present underneath, it forms a transmission line (stripline) with the trace. The oppositely-directed return currents flow through the ground plane directly beneath the trace. This confines the electromagnetic fields to the area between the trace and the ground plane, reducing crosstalk.

In a lens antenna, the directivity pattern is a result of the difference between the phase velocity of propagation of an electromagnetic wave in air and that in the lens material ($n \neq 1$). The shape of the lens depends on the refractive index n (the ratio of the phase velocity of propagation of a radio wave in a vacuum to that in the lens). A decelerating lens antenna, as in optics, is one for which $n>1$. The lens of these kinds of antennas is preferably made of high-quality low-loss homogeneous dielectrics, such as polymers.

The probing structure preferably comprises at least one first probe configured to communicate in a first frequency band, and at least one second probe configured to communicate in a second frequency band, which allows the antenna to be implemented in a Multiple Input Multiple Output (MIMO) system. MIMO technology has recently developed as a new technology to achieve very high bandwidth efficiencies and larger data rates in modern wireless communications. In MIMO technology, multiple antennas are placed at the input and output side of a communication system to improve the channel capacities. The multidimensional statistical behaviour of the MIMO fading channel and the design parameters of the antennas that are taken at the transmitter and receiver side are responsible for the improvement of data rates. Multiple Input Multiple Output (MIMO) technology is the latest paradigm, where multiple antennas are used at both transmitter and receiver to improve communication performance. It is one of several forms of smart antenna technology. MIMO technology has attracted attention in wireless communications, because it offers significant increase in data throughput, channel capacity and link range without additional bandwidth or increase transmitted power. Because of these properties, MIMO is an important part of modern wireless communication standards such as IEEE802.11n (Wi-Fi), 4G, 3GPP long term evolution, WiMAX (Wireless interoperability for microwave access) and HSPA (High Speed Packet Access) etc. The main objective of MIMO systems is that the antennas in the array must provide diverse reception at smaller spacing. When the antennas are closely placed, the electromagnetic waves of different antennas interfere with each other resulting in signal loss. In MIMO systems, a major problem faced by the designers is mutual coupling, which arises mainly due to the electromagnetic interactions between the antennas in the array. This problem mainly occurs due to the small spacing between the antennas in the array. A parallel reasoning applies to the lens antenna according to preferred embodiments of the invention. Hence, it is favourable to keep sufficient distance between the adjacent probes to counteract mutual coupling, in particular in case the probing structure comprises multiple first probes and multiple second probes. This minimum distance is dependent on the wavelength of the electromagnetic radiation, the material of the lens, and the geometry of the probes.

In preferred embodiments, the antenna comprises at least one processor to automatically switch the probing structure between a radiation transmitting mode and a radiation receiving mode for two-way communication of the probing structure. More particularly, the processor is preferably configured to automatically switch between the first frequency band and the second frequency band for two-way communication in each frequency band.

At high frequencies, the radiation properties of super-shaped lens antennas can be investigated by means of a dedicated asymptotic technique based on optical ray approximation. In particular, Geometrical Optics is adopted to analyze the electromagnetic field propagation within the lens region. In doing so, the contribution of the multiple internal reflections is properly taken into account, so enhancing the accuracy of the modelling procedure especially where dielectric materials with relatively large permittivity are used in the design since, in this case, the common hypothesis that the energy content relevant to higher order reflected rays can be neglected is not applicable. Finally, by virtue of the equivalence principle, the electromagnetic field outside the lens can be evaluated by radiation in free space of the equivalent electric and magnetic current distributions along the interface with the air region. In the developed design methodology, these currents are determined by application of the local Fresnel transmission coefficients along the surface of the lens to the Geometrical Optics field in accordance with the Physical Optics method. In this context, the adoption of the Gielis' formula translates into the possibility of automatically reshaping the lens profile so that any automated optimization procedure, such as Genetic Algorithms, Neural Networks, Particle Swarm Optimization, and Ant Colony Optimization, can be applied in order to identify the geometrical parameters yielding optimal antenna performance.

The electric field distribution transmitted outside the lens region can be conveniently evaluated as:

$$\vec{E}_t = \sum_m \vec{E}_t^m, \text{ with:} \tag{6}$$

$$\vec{E}_t^m = \|\vec{E}_{i'}^m\| e^{j \angle \vec{E}_{i'}^m} \frac{(\hat{n} \times \hat{k}_t^m) \times \hat{k}_t^m}{\|(\hat{n} \times \hat{k}_t^m) \times \hat{k}_t^m\|} + E_{t\perp}^m \frac{\hat{n} \times \hat{k}_t^m}{\|\hat{n} \times \hat{k}_t^m\|} \tag{7}$$

denoting the electric field contribution pertaining to the internal reflection process of order m. In (7), $\hat{n}$ denotes the normal to the surface of the lens, $\hat{k}_t^m = \vec{k}_t^m/\|\vec{k}_t^m\|$ is the normalized wave propagation vector of the m-th reflected beam transmitted out of the lens with $\|\vec{k}_t^m\|=2\pi/\lambda_0$, $\lambda_0$ being the operating wavelength in the vacuum. In particular, $\vec{E}_{t'}^m$ and $E_{t\perp}^m$ are the parallel and orthogonal components, respectively, of the transmitted wave contribution due to the m-th reflected beam. These field quantities are determined by multiplying the components $\vec{E}_{t'}^m$, $E_{t\perp}^m$ of the internal field $\vec{E}_i^m$ impinging on the surface of the lens with the proper Fresnel transmission coefficients. The evaluation of $\vec{E}_{i'}^m$, $E_{i\perp}^m$ is, in turn, carried out by means of the following relations:

$$E_{i\perp}^m = \vec{E}_i^m \cdot \frac{\hat{n} \times \hat{k}_i^m}{\|\hat{n} \times \hat{k}_i^m\|}, \tag{8}$$

$$\vec{E}_{i'}^m = \vec{E}_i^m - E_{i\perp}^m \frac{\hat{n} \times \hat{k}_i^m}{\|\hat{n} \times \hat{k}_i^m\|}. \tag{9}$$

The incident field $\vec{E}_i^m$ (P) at the general point P is directly computed by using the far-field pattern of the source if m=1. On the other hand, for m>1, $\vec{E}_i^m$ (P) is derived starting from the m-th reflected wave contribution as:

$$\vec{E}_i^m(P) = \vec{E}_i^m(P_m) e^{jk_i d}, \tag{10}$$

with d denoting the Euclidean distance between the observation point P and the point $P_m$ at which the reflection takes place. The reflected field $\vec{E}_i^m(P_m)$ appearing in (10) is given by:

$$\vec{E}_r^m(P_m) = \|\vec{E}_{r'}^m\| e^{j \angle \vec{E}_{r'}^m} \frac{(\hat{n} \times \hat{k}_r^m) \times \hat{k}_r^m}{\|(\hat{n} \times \hat{k}_r^m) \times \hat{k}_r^m\|} + E_{r\perp}^m \frac{\hat{n} \times \hat{k}_r^m}{\|\hat{n} \times \hat{k}_r^m\|}, \tag{11}$$

where the parallel and orthogonal components with respect to the plane of incidence, $\vec{E}_{r'}^m$ and $E_{r\perp}^m$, are computed by multiplication of the corresponding components, $E_{i'}^m$ and $E_{i\perp}^m$, of the incident field at the point $P_m$ with the proper Fresnel reflection coefficients. In (11), $\vec{k}_i^m = \vec{k}_i^m/\|\vec{k}_i^m\|$ is the normalized wave vector of the incident field with $\|\vec{k}_i^m\|=2\pi n_d/\lambda_0$, $n_d$ being the refractive index in the dielectric material forming the lens.

Once the Geometrical Optics field has been evaluated, the equivalent electric $\vec{J}_S$ and magnetic $\vec{M}_S$ current densities along the surface of the lens can be determined in a straightforward manner. In this way, according to the physical optics method, the electromagnetic field radiated by the antenna at the observation point $P_{FF} \equiv (r_{FF}, \theta_{FF}, \phi_{FF})$ can be readily computed by means of the integral expression:

$$\vec{E}_{FF}(P_{FF}) = j \frac{e^{-jk_0 r_{FF}}}{2\lambda_0 r_{FF}} \int_S [\eta_0 \vec{J}_S(P) \times \hat{u}_0 - \vec{M}_S(P)] \times \hat{u}_0 e^{jk_0 \vec{r} \cdot \hat{u}_0} dS, \tag{12}$$

where $\hat{u}_0$ is the unit vector normal to the surface of the lens at the general point $P \equiv (r, \theta, \phi)$.

The preferred embodiments of the invention also relate to an antenna system for transmitting and receiving electromagnetic signals comprising at least one antenna according to the invention. The antenna system comprises a plurality of MIMO-configured antennas as described above, wherein each antenna comprises multiple probes. The system preferably also comprises at least two multi-band antennas, and at least one processor for switching in at least one of the frequency bands, so ensuring diversity of reception and transmission of the signals in this band. Preferably, a processor is configured to control switching means, wherein the switching means is a SPDT (Single Port Double Throw) switch or a DPDT (Double Port Double Throw) switch. Preferably, the system further comprises at least one interface means for programming the at least one processor, and therefore for programming (configuring) the antenna as such.

According to some embodiments, the invention further relates to a method of manufacturing an antenna according to the invention, comprising the step of assembling the ground plane, the lens, and the probing structure, said probing structure comprising multiple probes, wherein the mutual orientation of at least two probes is such that said probes are positioned at least partially out of the electromagnetic line of sight of each other. According to some embodiments, advantages of using the multi-probe lens antenna, wherein at least two probes are positioned out of the line of sight of each other, have been described above already in a comprehensive manner. Preferably, at least one ground plane and/or at least one lens is designed such that the ground plane and/or the lens has at least one base profile which is substantially supershaped, said supershape defined by the polar function (superformula):

$$\rho_d(\varphi) = \frac{1}{\sqrt[n_1]{\left|\frac{1}{a}\cos\frac{m_1}{4}\varphi\right|^{n_2} + \left|\frac{1}{b}\sin\frac{m_2}{4}\varphi\right|^{n_3}}}$$

a, b $\in \mathbb{R}^+$; $m_1$, $m_2$, $n_1$, $n_2$, $n_3 \in \mathbb{R}$, a, b, $n_1 \neq 0$
and wherein:
$\rho_d(\phi)$ is a curve located in the XY-plane; and
$\phi \in [0, 2\pi)$ is the angular coordinate.

During the assembling preferably multiple probes are connected to the ground plane and/or the lens. At least one probe is preferably configured to communicate in a first frequency band and at least one other probe is configured to communicate in a second frequency band. More preferably, the different probes are oriented such that, during operation, different sectors of the lens will be excited. It is favourable in case the probes are positioned out of the line of sight in order to counteract mutual coupling.

According to some embodiments, the invention further relates to a method for use in wireless communications by using an antenna according to the invention, the method comprising the step of connecting a communication circuit to an antenna network, the network comprising a plurality of antennas according to the invention, each antenna optimized for operation in at least one designated frequency band. The optimization of the antenna geometry and material completely depends on the specific purpose. The communication circuit commonly comprises a transmitter and/or a receiver which in combination form a transceiver. Each antenna is preferably optimized for operation in multiple frequency bands, wherein each probe is configured to operate within a designated (single) frequency or frequency band. The antennas can be connected either in parallel or in series.

According to some embodiments, the invention additionally relates to a lens as used in an antenna according to the invention. The invention also relates to a ground plane as used in an antenna according to the invention. Advantages and embodiments of these antenna components have been described above in a comprehensive manner.

A still further embodiment of the present invention refers to an RF transceiver of a wireless communications device, wherein an antenna according to the invention is employed.

Finally, in some embodiments, the invention refers to an electronic device having a wireless interface which comprises an RF transceiver as described above.

BRIEF DESCRIPTION OF THE DRAWINGS

Various illustrative embodiments of the invention will be elucidated on the basis of non-limitative exemplary embodiments shown in the following figures. Herein:

FIG. 3b shows a top view and FIG. 3c shows a detailed top view of the lens antenna as shown in FIG. 3a;

DETAILED DISCUSSION OF THE PREFERRED EMBODIMENTS

Figure 1:
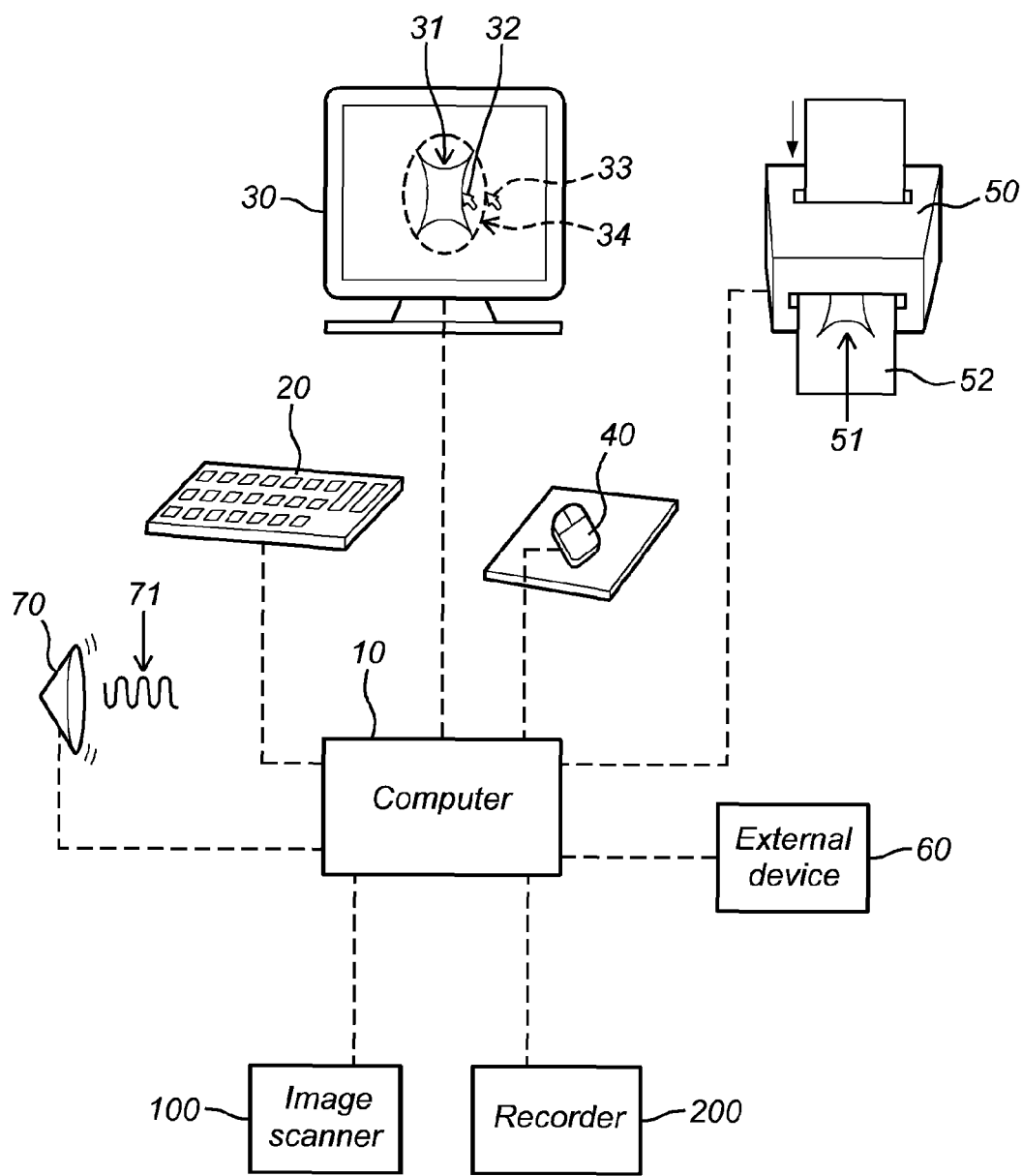
FIG. 1 shows a schematic diagram showing various components that can be included in various embodiments for the synthesis of patterns and/or for the analysis of patterns with the super-formula operator.

According to the first aspect, for illustrative purposes with reference to FIG. 1, which is also incorporated in U.S. Pat. No. 7,620,527 as FIG. 16, shapes or waves of a ground plane and/or a lens of an antenna according to the invention, can be "synthesized" by the application of the following exemplary basic steps:

In a first step, a choice of parameters is made (e.g., by either inputting values into the computer 10, i.e., via a keyboard 20, a touch screen, a mouse-pointer, a voice recognition device or other input device or the like, or by having the computer 10 designate values), and the computer 10 is used to synthesize a selected super-shape based on the choice of parameters.

In a second optional step, the super-formula can be used to adapt the selected shapes, to calculate optimization, etc. This step can include use of: graphics programs (e.g., 2D, 3D, etc.); CAD software; finite element analysis programs; wave generation programs; or other software.

In a third step, the output from the first or second step is used to transform the computerized super-shapes into a physical form, such as via: (a) displaying the super-shapes 31 on a monitor 30, printing the super-shapes 51 upon stock material 52 such as paper from a printer 50 (2-D or 3-D); (b) performing computer aided manufacturing (e.g., by controlling an external device 60, such as machinery, robots, etc., based on the output of step three); (c) generating sound 71 via a speaker system 70 or the like; (d) performing stereo lithography; (e) performing rapid prototyping commonly based on 3D printing technology; and/or (f) utilizing the output in another manner known in the art for transforming such shapes.

Various computer aided manufacturing ("CAM") techniques and products made therefrom are known in the art and any appropriate CAM technique(s) and product(s) made can be selected. As just some examples of CAM techniques and products made therefrom, see the following U.S. Patents (titles in parentheses), the entire disclosures of which are incorporated herein by reference: U.S. Pat. No. 5,796,986 (Method and apparatus for linking computer aided design databases with numerical control machine database); U.S. Pat. No. 4,864,520 (Shape generating/creating system for computer aided design, computer aided manufacturing, computer aided engineering and computer applied technology); U.S. Pat. No. 5,587,912 (Computer aided processing of three dimensional objects and apparatus therefor); U.S. Pat. No. 5,880,962 (Computer aided processing of 3-D objects and apparatus thereof); U.S. Pat. No. 5,159,512 (Construction of Minkowski sums and derivatives morphological combinations of arbitrary polyhedral in CAD/CAM systems).

Various stereo lithography techniques and products made therefrom are known in the art and any appropriate stereo lithographic technique(s) and product(s) made can be selected. As just some examples of stereo lithographic techniques and products made therefrom, see the following U.S. Patents (titles in parentheses), the entire disclosures of which are incorporated herein by reference: U.S. Pat. No. 5,728,345 (Method for making an electrode for electrical discharge machining by use of a stereo lithography model); U.S. Pat. No. 5,711,911 (Method of and apparatus for making a three-dimensional object by stereo lithography); U.S. Pat. No. 5,639,413 (Methods and compositions related to stereo lithography); U.S. Pat. No. 5,616,293 (Rapid making of a prototype part or mold using stereo lithography model); U.S. Pat. No. 5,609,813 (Method of making a three-dimensional object by stereo lithography); U.S. Pat. No. 5,609,812 (Method of making a three-dimensional object by stereo lithography); U.S. Pat. No. 5,296,335 (Method for manufacturing fibre-reinforced parts utilizing stereo lithography tooling); U.S. Pat. No. 5,256,340

(Method of making a three-dimensional object by stereo lithography); U.S. Pat. No. 5,247,180 (Stereo lithographic apparatus and method of use); U.S. Pat. No. 5,236,637 (Method of and apparatus for production of three dimensional objects by stereo lithography); U.S. Pat. No. 5,217,653 (Method and apparatus for producing a stepless 3-dimensional object by stereo lithography); U.S. Pat. No. 5,184,307 (Method and apparatus for production of high resolution three-dimensional objects by stereo lithography); U.S. Pat. No. 5,182,715 (Rapid and accurate production of stereo lithographic parts); U.S. Pat. No. 5,182,056 (Stereo lithography method and apparatus employing various penetration depths); U.S. Pat. No. 5,182,055 (Method of making a three-dimensional object by stereo lithography); U.S. Pat. No. 5,167,882 (Stereo lithography method); U.S. Pat. No. 5,143,663 (Stereo lithography method and apparatus); U.S. Pat. No. 5,130,064 (Method of making a three dimensional object by stereo lithography); U.S. Pat. No. 5,059,021 (Apparatus and method for correcting for drift in production of objects by stereo lithography); U.S. Pat. No. 4,942,001 (Method of forming a three-dimensional object by stereo lithography and composition therefore); U.S. Pat. No. 4,844,144 (Investment casting utilizing patterns produced by stereo lithography).

Moreover, the present invention can be used in known micro-stereo lithographic procedures. For example, the present invention can, thus, be used in the creation of computer chips and other items. Some illustrative articles, the disclosures of which are incorporated herein by reference, are as follows: A. Bertsch, H Lorenz, P. Renaud "3D microfabrication by combining microstereolithography and thick resist UV lithography," Sensors and Actuators: A, 73, pp. 14-23, (1999). L. Beluze, A. Bertsch, P. Renaud "Microstereolithography: a new process to build complex 3D objects," Symposium on Design, Test and microfabrication of MEMs/MOEMs, Proceedings of SPIE, 3680(2), pp. 808-817, (1999). A. Bertsch, H. Lorenz, P. Renaud "Combining Microstereolithography and thick resist UV lithography for 3D microfabrication," Proceedings of the IEEE MEMS 98 Workshop, Heidelberg, Germany, pp. 18-23, (1998). A. Bertsch, J. Y. Jézéquel, J. C. André "Study of the spatial resolution of a new 3D microfabrication process: the microstereophotolithography using a dynamic mask-generator technique," Journal of Photochem. and Photobiol. A: Chemistry, 107, pp. 275-281, (1997). A. Bertsch, S. Zissi, J. Y. Jézéquel, S. Corbel, J. C. André "Microstereophotolithography using a liquid crystal display as dynamic mask-generator," Micro. Tech., 3(2), pp. 42-47, (1997). A. Bertsch, S. Zissi, M. Calin, S. Ballandras, A. Bourjault, D. Hauden, J. C. André "Conception and realization of miniaturized actuators fabricated by Microstereophotolithography and actuated by Shape Memory Alloys," Proceedings of the 3rd France-Japan Congress and 1st Europe-Asia Congress on Mechatronics, Besançon, 2, pp. 631-634, (1996). Similarly, various rapid prototyping techniques and products made therefrom (e.g., moulds, etc.) are known in the art and any appropriate technique(s) and product(s) made can be selected. For example, three exemplary 3-Dimensional model rapid prototyping methods currently available, include, as described in U.S. Pat. No. 5,578,227, the disclosure of which is incorporated herein by reference: a) photocurable liquid solidification or stereo lithography (e.g., see above); b) selective laser sintering (SLS) or powder layer sintering; c) fused deposition modelling (FDM) or extruded molten plastic deposition method. As just some examples of rapid prototyping techniques and products made therefrom, see the following U.S. Patents (titles in parentheses), the entire disclosures of which are incorporated herein by reference: U.S. Pat. No. 5,846,370 (Rapid prototyping process and apparatus therefor); U.S. Pat. No. 5,818,718 (Higher order construction algorithm method for rapid prototyping); U.S. Pat. No. 5,796,620 (Computerized system for lost foam casting process using rapid tooling set-up); U.S. Pat. No. 5,663,883 (Rapid prototyping method); U.S. Pat. No. 5,622,577 (Rapid prototyping process and cooling chamber therefor); U.S. Pat. No. 5,587,913 (Method employing sequential two-dimensional geometry for producing shells for fabrication by a rapid prototyping system); U.S. Pat. No. 5,578,227 (Rapid prototyping system); U.S. Pat. No. 5,547,305 (Rapid, tool-less adjusting system for hot stick tooling); U.S. Pat. No. 5,491,643 (Method for optimizing parameters characteristic of an object developed in a rapid prototyping system); U.S. Pat. No. 5,458,825 (Utilization of blow molding tooling manufactured by stereo lithography for rapid container prototyping); U.S. Pat. No. 5,398,193 (Method of three-dimensional rapid prototyping through controlled layerwise deposition/extraction and apparatus therefor).

Figure 2:
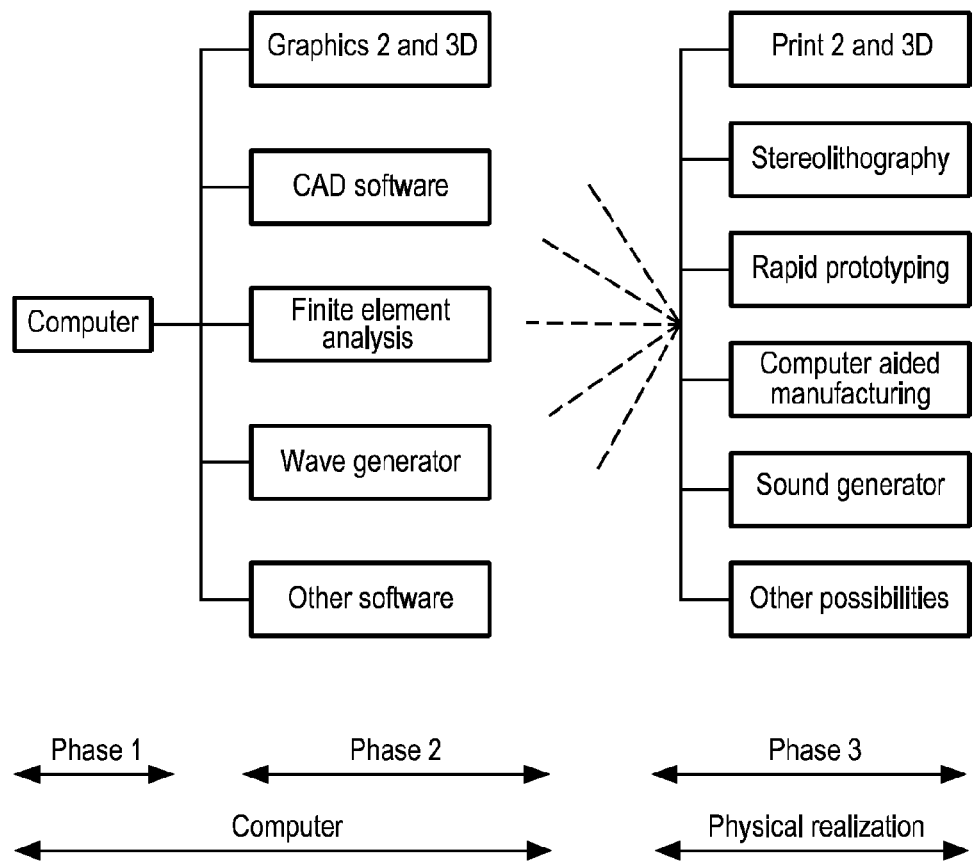
FIG. 2 shows a schematic diagram illustrating steps or phases that can be performed in exemplary embodiments involving synthesis of patterns with the super-formula.

The above-noted three steps, or phases, are also schematically illustrated in the schematic diagram shown in FIG. 2 (steps 1 and 2 being capable of being carried out within the computer itself as shown). This figure corresponds to FIG. 17 of U.S. Pat. No. 7,620,527.

In the following sections, a number of exemplary embodiments of pattern "synthesis" with the super-formula are described in further detail.

A. 2-D Graphical Software

The present invention has great utility in 2-D graphic software applications.

The present invention can be applied, for example, in conventional commercial programs such as Corel-Draw™ and Corel-Paint™, Open Office applications, Supergraphx™ for Adobe Illustrator and Photoshop™, Adobe Photoshop™, in various drawing programs in Visual Basic™ or Windows™, or in other environments like, for example, Lotus WordPro™ and Lotus Freelance Graphics™, Java™, Visual C™ Visual C++™ and all other C-environments. The present invention has substantial advantages in image synthesis because, among other things, the present approach enables a substantial savings in computer memory space because only the super-formula with classical functions (such as powers, trigonometric functions, etc.) needs to be utilized. In addition, the number of image shapes available with the super-formula is substantially increased beyond that previously available.

Graphics programs (such as Paint in Windows™, drawing tools in Microsoft Word™ Corel-Draw™, CAD, that used in architectural design, etc.) use "primitives" which are shapes programmed into the computer. These are very restrictive, e.g., often limited to mainly circles, ellipses, squares and rectangles (in 3-D, volumetric primitives are also very restricted).

The introduction of the super-formula greatly enlarges by several orders of magnitude the overall possibilities in 2-D graphics (and also in 3-D graphics as discussed below). Used as a linear operator it can operate in many different ways and formulations, whether polar coordinates, etc., and also in 3-D using spherical coordinates, cylindrical coordinates, parametric formulations of homogenized cylinders, etc.

Some exemplary embodiments within 2-D graphics software applications are as follows.

a.1. The computer can be adapted to make plain use of the operator, in for example polar coordinates or in XY coordinates. In this sense, the parameters can be chosen (e.g., by an operator input or by the computer itself) and used as input in the super-formula (e.g., via programming). The individual shapes or objects can be used in any manner, such as to print or display an object, etc.

a.2. The computer can also be adapted to perform operations such as integration to calculate area, perimeter, moment of inertia, etc. In this regard, the computer can be adapted to perform such an operation either by a) selection of such operation via an operator input (e.g., via keyboard 20) or b) adapting of the computer (e.g., via pre-programming) to perform such operations.

a.3. The computer can be adapted (e.g., via software) to: a) display or otherwise present shapes; b) to allow a user to modify such shapes after the display thereof; and c) to display the shape as modified by the user. In this regard, the user can modify the shape by, for example, changing parameters. In an exemplary embodiment, the computer can be adapted to enable shapes that are displayed or otherwise presented (i.e., presented in step three noted above) by physically acting on the physical representation created in step three. In a preferred embodiment, the computer can be adapted to enable shapes that are displayed on a monitor to be modified by pulling out sides and/or corners of the pattern, e.g. image. In that regard, preferably, an image 31 is displayed on a computer screen or monitor 30 and a user can use his hand manipulated "mouse" 40 (or other user-manipulated screen or display pointer device) to place a displayed pointer 32 on the shape to "click" and "drag" the same to a new position 33—thereby moderating the super-shape to assume a new "super-shape" configuration 34. This will also include a recalculation of the formula and parameters.

a.4. The computer can also be adapted to perform operations whereby more than one of the individual shapes generated in a1 or a3 are taken together, either through the process of super-position. In some cases, individual super-shapes that are combined by, e.g., super-position and/or reiteration or the like may be, e.g., sectors or sections that are combinable to create shapes having differing sections or regions (as just one illustrative example, a sector of a circle between, e.g., 0 and $\pi/2$ can be combined with a sector of a square between, e.g., $\pi/2$ and $\pi$ to create a multi-component shape). The computer can also be adapted to perform additional operations upon the created super-shapes—e.g., to flatten, skew, elongated, enlarge, rotate, move or translate, or otherwise modify such shapes.

B. 3-D Graphical Software

As with 2-D applications, the present invention has great utility in 3-D graphic software applications (as well as in representations in various other dimensions).

The present invention can be applied, for example, in Computer Aided Design ("CAD") software, software for Finite Element Analysis ("FEM"), Supergraphx 3D Shape Explorer, antenna design and analysis software, such as CST, Ansoft HFSS, Remcom XFdtd, EMSS Feko, Empire XCcel, architectural design software, etc. The present invention allows, for example, one to use single continuous functions, rather than spline functions, for various applications. Industrial applications of CAD include, e.g., use in Rapid Prototyping or in Computer Aided Manufacturing ("CAM") including 3D printing.

Figure 3A:
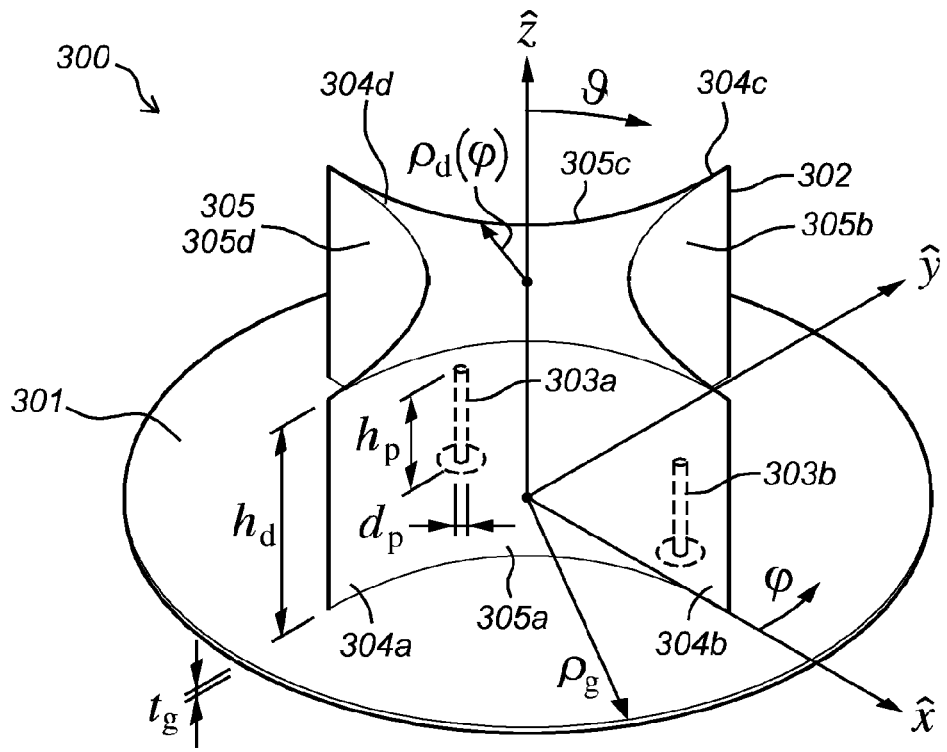
FIG. 3a shows a perspective view of an embodiment of a lens antenna according to the invention.

Reference is made to FIG. 3a, wherein an embodiment of a lens antenna 300 according to preferred embodiments of the invention is shown. The antenna 300 comprises a ground plane 301, an electromagnetic lens 302 mounted to said ground plane 301, and a probing structure comprising two probes 303a, 303b. The lens 302 has a prismatic shape which complies with the superformula. The lens 302 is made of PVC in this example. The lens 302 is provided with an accommodating space 304 for accommodating the probe. The ground plane 301 is made of metal. Both the two probes 303a and the ground plane 301 are connected, commonly via a control circuit (not shown), to an electrical power source, such as a battery (DC) or mains (AC). The lens 302 in this embodiment acts as dielectric resonator which makes the lens antenna 300 a dielectric resonator antenna (DRA). Since the lens 302 complies with the superformula, this antenna 300 can also be considered as a supershaped antenna (S-DRA). The circular metal plate acting as ground plane 301 has a radius plane. The antenna 300 is fed from the bottom side by means of a coaxial connector turning, at the ground plane level, into each electric probe 303a of length $h_p$ and diameter $d_p$. The probes 303a, 303b can have identical geometries, or can have different geometries. This latter option is commonly most favourable in case the lens antenna 300 should be configured as multiband antenna. Each probe is located at $(x_p, y_p, 0)$. The metal ground plane 301 has a radius $\rho_g$ and a thickness $t_g$. The prismatic lens 302 had its axis aligned along the z-direction and its base profile defined by the polar function:

$$\rho_d(\varphi) = \left[ \left| \frac{1}{a}\cos\left(\frac{m}{4}\varphi\right) \right|^{n_2} + \left| \frac{1}{b}\sin\left(\frac{m}{4}\varphi\right) \right|^{n_3} \right]^{-1/n_1}$$

wherein $\rho_d(\varphi)$ is a curve located in the xy-plane and $\varphi \in [0, 2\pi)$ is the angular coordinate. In this example the following values are used to arrive at the shape of the lens 302 as shown in FIG. 3: $a=b=1$; $m=4$; and $n_1=n_2=n_3=\frac{1}{2}$.

The polymeric lens 302 is provided with two accommodating spaces, each accommodated being configured to accommodate a single probe 303a, 303b in a well-fitting manner. The accommodating spaces, and therefore the probes 303a, 303b are positioned in or near different edges 304a, 304b of the lens 302, as a result of which the probes 303a, 303b are positioned out of the line of sight (see the dashed line) of each other, which is further visualised in FIG. 3a and FIG. 3b. As shown, a circumferential wall 305 comprises four concave wall parts 305a, 305b, 305c, 305d connected to each other, as a result of which the aforementioned four corners 304a, 304b, 304c, 304d are defined. One of the concave wall parts 305a is provided with a selective corrugated profile. Electromagnetic radiation excited by a probe 303a, 303b will be reflected (see arrows) by the wall parts 305a, 305b, 305c, 305d, and in particular by the intermediate corrugated wall parts 305a, in a direction away from the other probe 303b, 303a so that mutual coupling and hence interference can be counteracted.

PVC used for the lens 302 in this illustrative example is a thermoplastic polymer produced in enormous quantities in reason of low cost and ease of processing. Moreover, PVC is extremely durable and resistant to chemical corrosion and thus very well adapted to outdoor applications. Additionally, PVC can be blended with different materials providing a wide range of physical properties. The use of PVC can then result in an inexpensive option for manufacturing intricately shaped dielectric resonator/lens antennas by using conventional drilling/milling or more advanced three-dimensional printing techniques. This is furthermore of significant importance in order to enhance the aesthetic quality of the proposed radiating structures when used for wireless communications in habitable structures such as residential units, office buildings, theaters, stadiums, etc. Not only PVC enables the implementation of complicated resonator/lens geometries, but, thanks to its low permittivity, it also favours a lowering of the antenna quality factor and, hence, a widening of the working frequency band, as well as an enhancement of the energy radiation level. It has been found that the proposed radiators outperform the classical dielectric resonator/lens antennas both in terms of fractional bandwidth and gain. Thanks to the use of plastic materials, such performance is achievable with reduced manufacturing costs. This feature is particularly desirable in mass-production contexts typical of new-generation wireless multimedia applications. It is also possible to use 3D printing for single production of antennas, tailored to specific applications. Typically, in 3D printing three-dimensional solid objects are formed using an additive process in which successive layers of material are laid down one upon the other to create desired. In both mass production and in 3D printing, a variety of plastics can be used, including bioplastics and combinations of plastics, depending on the dielectric constants of the material.

The manufacturing of antennas for radar, satellite, and wireless communications typically entails using expensive microwave materials with significant environmental impact due to large carbon dioxide emission levels in the production processes, and difficulty in recycling. On the other hand, the suggested use of plastics and in particular polyvinyl chloride (PVC), for the manufacturing of the supershaped dielectric resonators and lenses provides clear advantages in terms of sustainability. As a matter of fact, PVC is a material well-suited to recycling, and requires fewer natural resources since it is mostly made out of chlorine, which is derived from common salt that is abundant on the Earth. Therefore, in contrast to other plastics, PVC contributes significantly to saving oil, which is a non-renewable resource. Besides, PVC requires only about 80% of the energy need required for the production of other polymers. Finally, it is to be stressed that alternative low-carbon materials can be usefully employed in the manufacturing of supershaped dielectric resonator/lens antennas with a favourable environmental effect, while keeping a good device performance in terms of circuital characteristics and radiation properties.

In addition, in other embodiments, various other materials can be employed to produce antennas in a highly sustainable way. Moreover antennas with dynamic shape changes to modify its behaviour for specific purposes, using liquid components (such as liquid crystals) can be employed, with the dynamics of shape changes modified by mechanical or electronic steering, or making use of other physical forces.

Figure 3B:
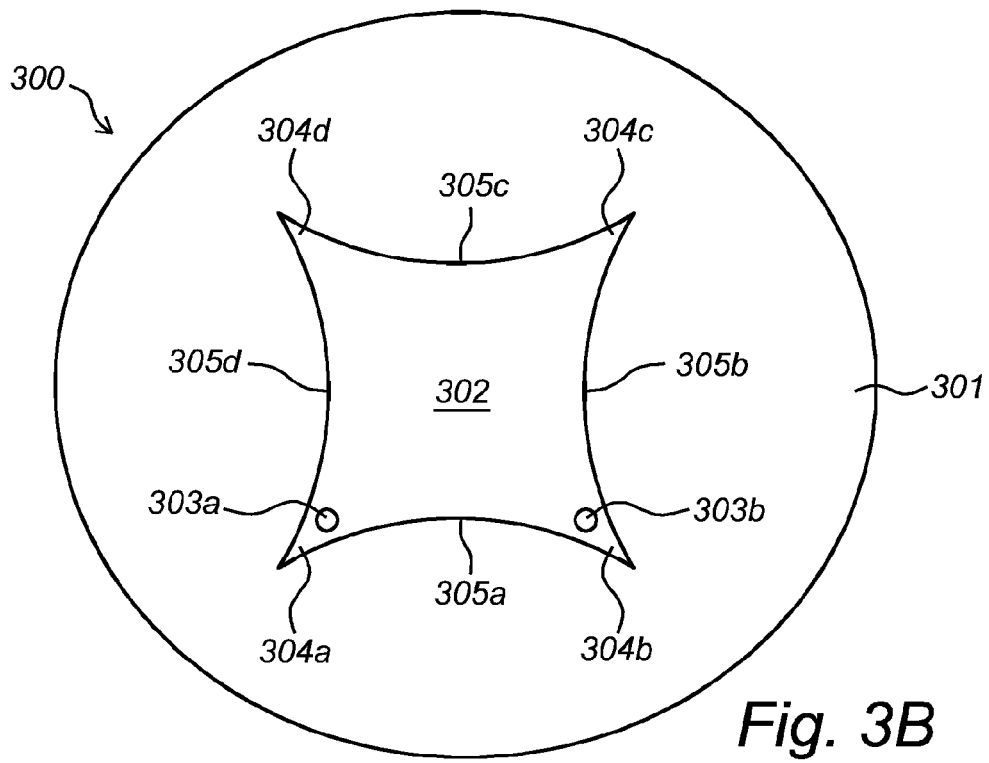
Figure 3C:
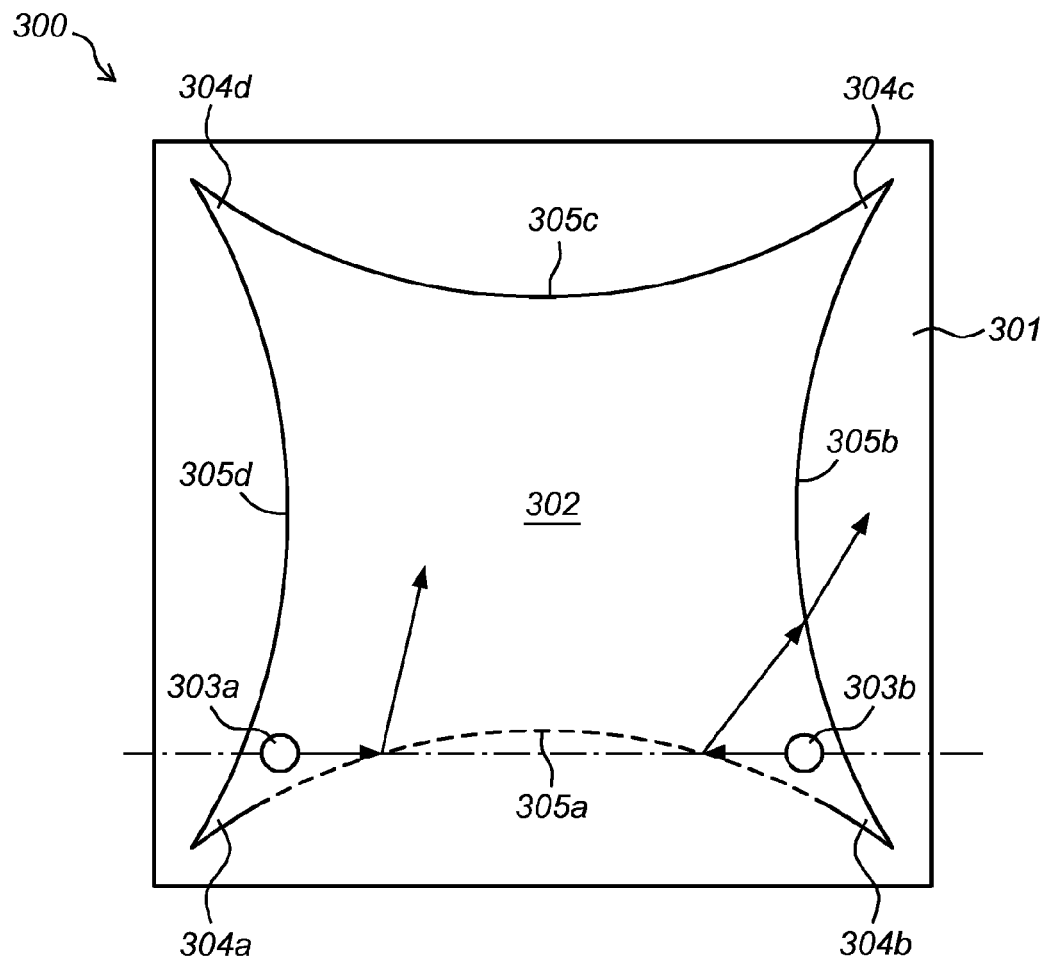
Figure 4:
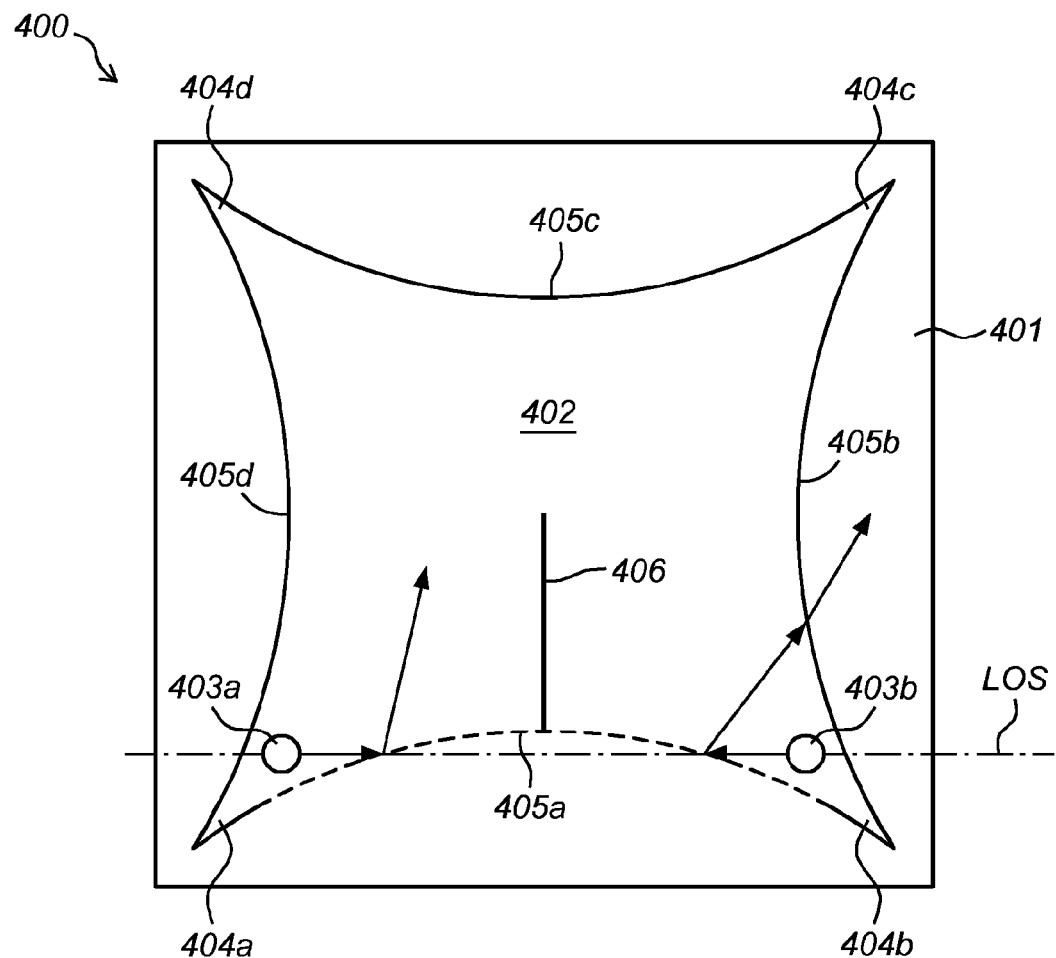
FIG. 4 shows a top view of an embodiment of another lens antenna according to the invention.

FIG. 4 shows a top view of a lens antenna 400 according to an embodiment of the invention, which is more or less similar to the antenna 300 as shown in FIGS. 3a-3c. The antenna 400 comprises a ground plane 401, an electromagnetic lens 402 mounted to said ground plane 401, and a probing structure comprising two probes 403a, 403b. The lens 402 has a prismatic shape which complies with the superformula, wherein a circumferential wall 404 is formed by four concave circumferential wall parts 404a, 404b, 404c, 404d, wherein adjacent wall parts 404a, 404b, 404c, 404d mutually form a sharp edge 405a, 405b, 405c, 405d of the lens 402. Both probes 403a, 403b are positioned in different sharp edges 405a, 405b of the lens 402. Due to the concave shape of the circumferential wall part 404a substantially situated between the probes 403a, 403b, the probes 403a, 403 do not see each other from an electromagnetic point of view. The direct line of sight (LOS) is roughly indicated by means of the horizontal dashed line LOS. Moreover, since the intermediate wall part 404a is provided with a profiled surface, the electromagnetic radiation transmitted by a probe 403a, 403b will be reflected away from the other probe 403a, 403b (see arrows), which will reduce mutual coupling, and hence which will reduce interference within the lens antenna 400, which will be in favour of the efficiency and capacity of the antenna 400. In this illustrative embodiment mutual coupling is further reduced by the presence of a separate reflective element 406 (a mirror). This reflective element 406 can be formed by a metal plate, and is incorporated in the lens body 402 and is reflective on both sides such that electromagnetic radiation reaching the reflective element 406 will be reflected back, which may further reduce interference of radiation patterns transmitted by the different probes 403a, 403b respectively. The lens 402 is made of PVC in this example. The ground plane 401 is made of metal. Both the two probes 403a, 403b and the ground plane 401 are connected, commonly via a control circuit (not shown), to an electrical power source, such as a battery (DC) or mains (AC). The lens 402 in this embodiment acts as dielectric resonator which makes the lens antenna 400 a dielectric resonator antenna (DRA). Since the lens 402 complies with the superformula, this antenna 400 can also be considered as a supershaped antenna (S-DRA). The probes 403a, 403b can have identical geometries, or can have different geometries.

Figure 5:
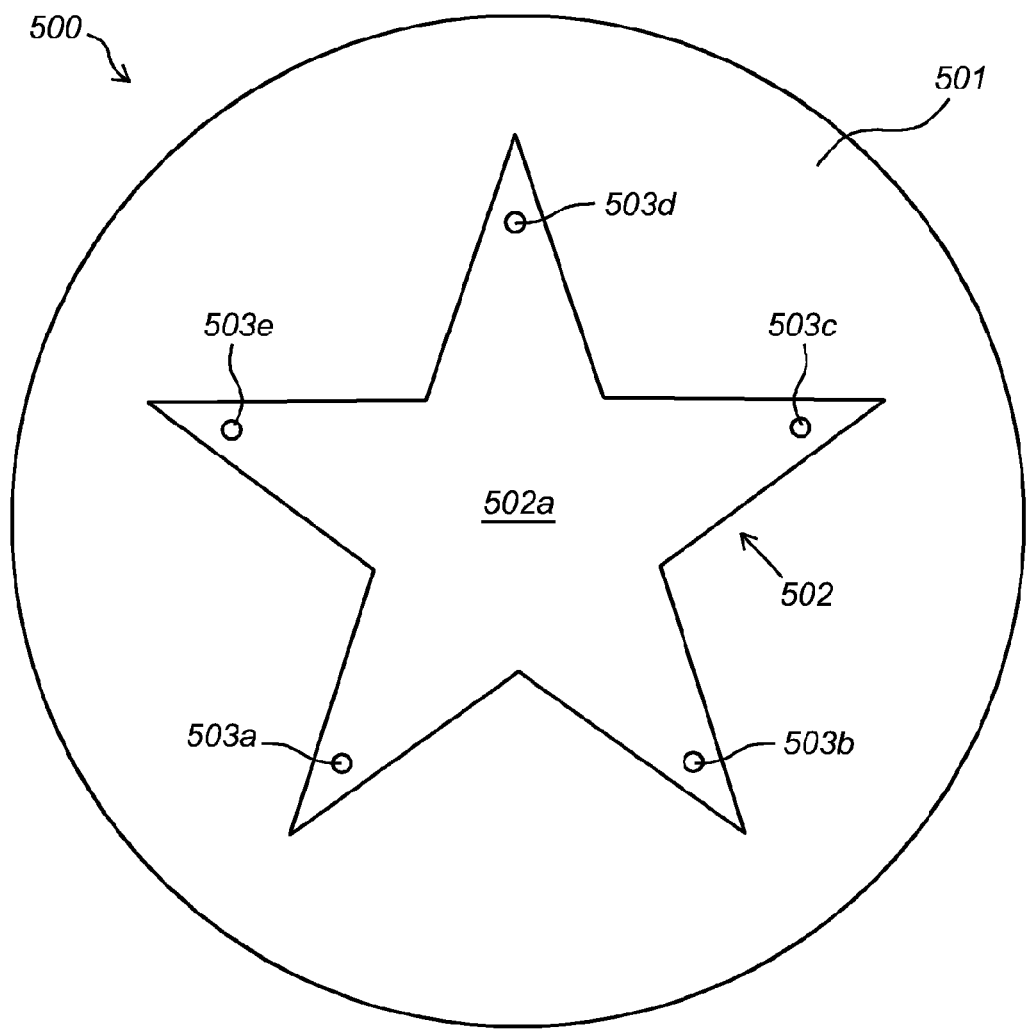
FIG. 5 shows a top view of yet an embodiment of another lens antenna according to the invention.

FIG. 5 shows a top view of another embodiment of a lens antenna 500 according to the invention. The lens antenna comprises a metal ground plane 501, an electromagnetic lens 502 mounted to said ground plane 501, and a probing structure comprising five probes 503a, 503b, 503c, 503d, 503e. The lens 502 has a prismatic shape and has a star shaped base profile 502a complying with the aforementioned superformula. The probes 503a, 503b, 503c, 503d, 503e are positioned, respectively, in different angular points (edges or corners) of the lens 502. In this manner, the different probes 503a, 503b, 503,c, 503d, 503e will practically not see each other and will therefore not interfere with each other. The different probes 503a, 503b, 503,c, 503d, 503e could have different geometry as to make the antenna 500 suitable for multiband operation, for example in Wi-Fi communication systems or in other communication systems.

Figure 6:
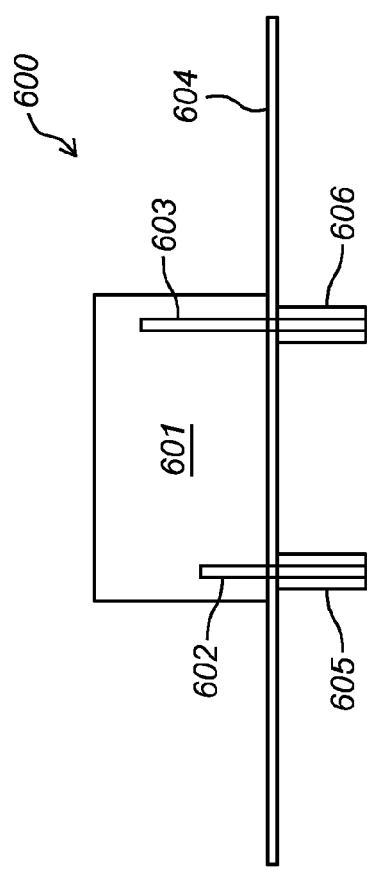
FIGS. 6-9 show schematic views of different antenna constructions according to the invention.

FIG. 6 shows a dual-band antenna 600 comprises a supershaped lens 601 enclosing two different probes 602, 603 having mutually distinctive geometries, wherein the probes 602, 603 are positioned out of the line of sight of each other. The lens 601 and the probes 602, 603 are connected to a flat ground plane 604. In some embodiments, instead of a flat ground plane 604 also a curved or otherwise shaped ground plane 604 can be used. Each of the probes 602, 603 extends from a coaxial connector 605, 606 which connector is also connected to said ground plane 604. The lens 601 is made of silicon in some examples. In some examples, the shortest probe 602 is configured to operate within a frequency band of 2.4 GHz, while the longest probe 603 is configured to operate within a frequency band of 5 GHz, which makes this compact antenna 600 well suitable to serve as dual-band Wi-Fi-antenna.

Figure 7:
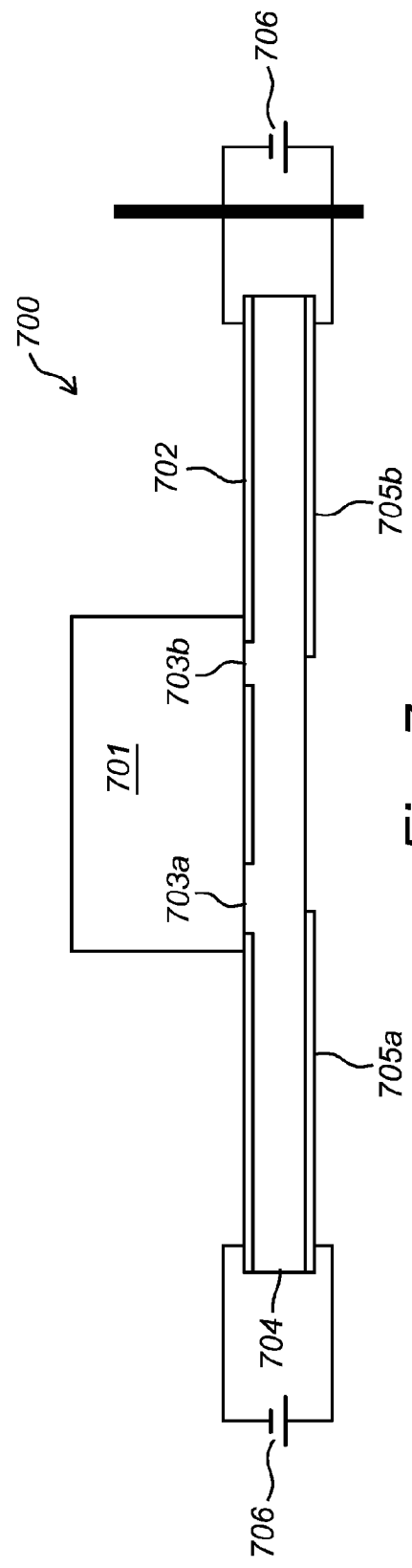

FIG. 7 shows a dual-band antenna 700 that comprises a lens 701, and a reflective supershaped ground plane 702 connected to said lens 701, wherein the ground plane 702 is provided with two central holes 703a, 703b, each hole 703a, 703b forming a slot or cavity between the lens 701 and a dielectric printed circuit board (PCB) 704 to which the ground plane 702 is attached. The holes 703a, 703b are positioned at least partially out of the line of sight of each other. A rear side of the PCB 704 is provided with two electrically conductive microstrips 705a, 705b. By connecting the ground plane 702 and each microstrip 705a, 705b to an electronic circuit 706 (schematically shown) including a power source, such as a battery, and commonly a control unit and a switch, a static planar wave front will be formed between each microstrip 705a, 705b and the ground plane 702 which will wave front will enter the lens 701 via each hole 703a, 703b and will turn into a spherical wave front within the lens 701. The electromagnetic radiation within the lens 701 will be internally reflected and excited in a controlled manner, dependent on the (super)shape of the lens 701 and eventually the supershape of the ground plane 702. This mechanism is also called a slot fed antenna.

Figure 8:
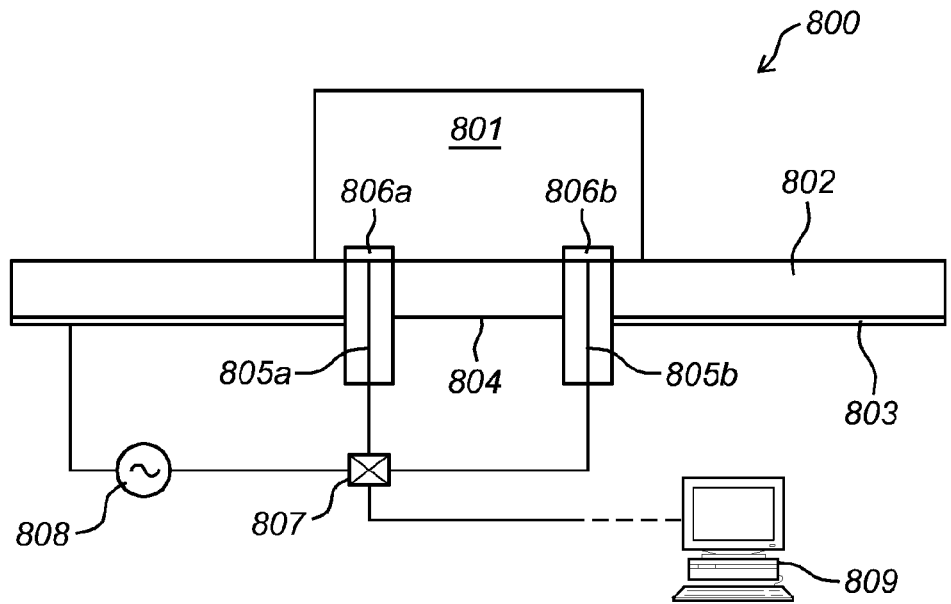

FIG. 8 shows a single-band antenna 800 that comprises a supershaped lens 801, which lens 801 is connected to a laminate of an insulating layer 802 and an electrically conductive layer 803 acting as ground plane. The electrically conductive layer 803 provided with a central hole 804 through which two probes 805a, 805b extend. An outer end of each probe 805a, 805b is connected to a conductive patch 806a, 806b of similar geometry which are positioned within the lens 801 and which are configured to couple electromagnetic into and/or out of the lens 801. The probes 805a, 805b are connected to control circuit 807 including a processor. Both the probes 805a, 805b and the electrically conductive layer 803 are connected to an AC power source 808. The control circuit 807 is configured to be programmed by means of a computer interface 809 which allows a user to define the purpose of the antenna 800 (transmitting signals, receiving signals, or both) and further characteristics of the antenna 800 such as the frequency band which is used by the antenna 800.

Figure 9:
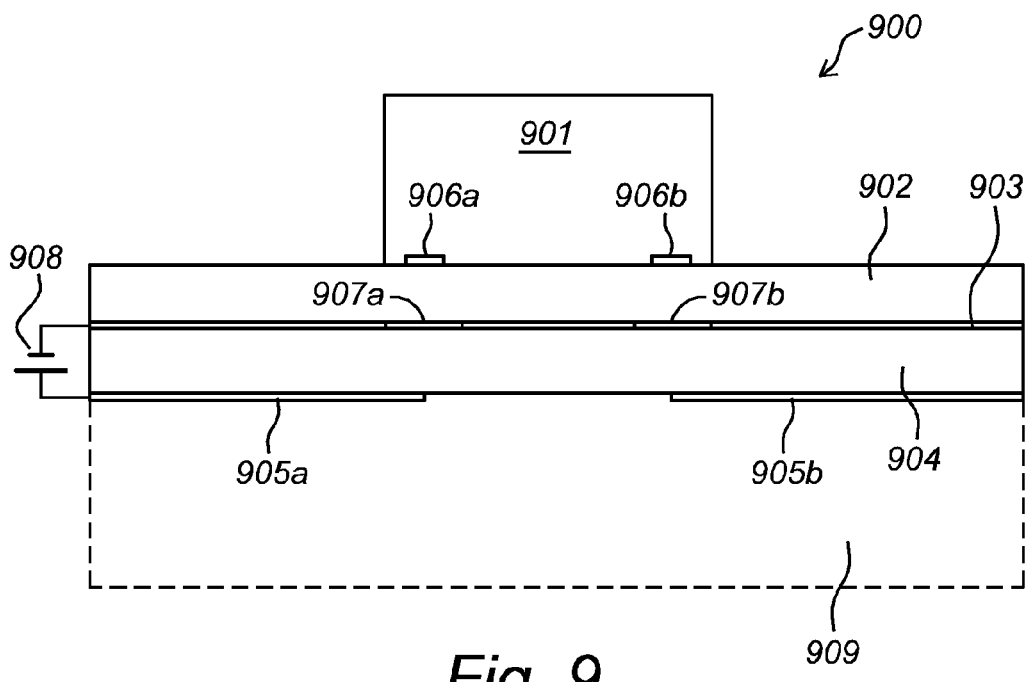

FIG. 9 shows a multi-band antenna 900 that comprises a supershaped dielectric resonator 901, which resonator 901 is connected to a laminate of a first insulating layer 902, an electrically conductive layer 903 acting as ground plane, a second insulating layer 904, and two microstrip 905a. 905b. In some embodiments, the resonator 901 is made of PVC or Teflon® or a combination/mixture of polymer and ceramics. Within the resonator 901 and onto the first insulating layer 902 two electrically conductive patches 906a, 906b are provided. The patches 906a, 906b can either have a flat geometry or a supershaped geometry. The ground plane 903 is made of metal and/or an electrically conductive polymer and is provided with two holes 907a, 907b, and each microstrip 905a, 905b extends such that an outer end will be positioned in line with one of said patch 906a, 906b. By connecting the microstrips 905a, 905b and the (intermediate) ground plane 903 to a power source 908 an electromagnetic planar wave front will be formed between the microstrip 905a, 905b and the ground plane 903 which will excite the patch 906 in such a manner that two spherical wave front are propagated into the lens. The patches 906 are positioned in such a way within the lens body 901 that the wave fronts do not interfere with each other. The antenna 900 can make part of an electronic device 909, such as e.g. a router, a notebook, or a mobile phone.

Figure 10:
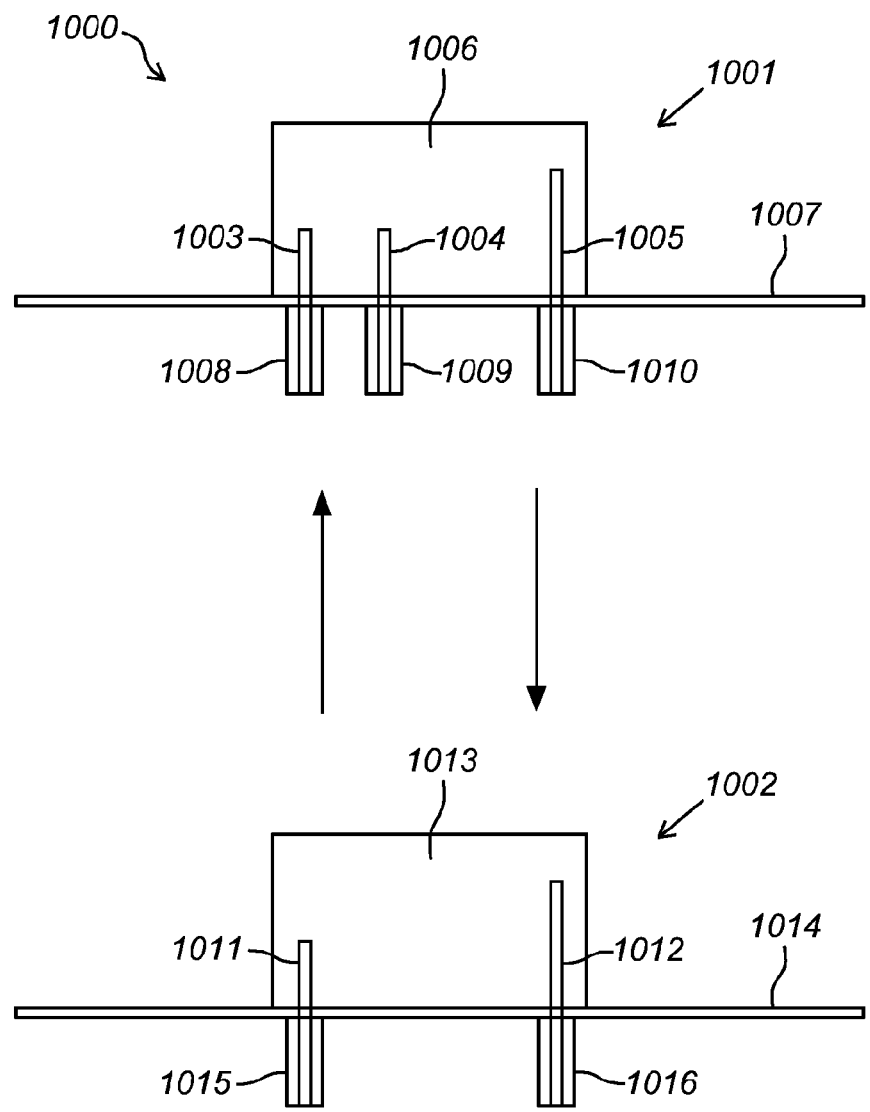
FIG. 10 shows a MIMO-configured antenna system according to an embodiment of the invention, comprising multiple antennas according to the invention.

FIG. 10 shows a MIMO-configured antenna system 1000 according to some embodiments of the invention, comprising multiple antennas 1001, 1002 according to the invention, wherein said antennas 1001, 1002 are configured to communicate with each other wirelessly in two directions. A first antenna 1001 comprises multiple probes 1003, 1004, 1005, wherein two probes 1003, 1004 have an identical geometry and are configured to operate within the same first frequency band, while the other probe 1005, having a different geometry, is configured to operate within another second frequency band. The probes 1003, 1004, 1005 are enclosed by a supershaped lens 1006 which is supported by a ground plate 1007. The probes make part of coaxial connectors 1008, 1009, 1010 which are connected to a control circuit (not shown). Use is made of two identical probes 1003, 1004, mutually positioned at sufficient distance from each other, in order to improve the communication and therefore reliability of this first antenna 1001. The other antenna 1002 comprises two probes 1011, 1012, wherein a first probe 1011 is configured to operate within the first frequency band, and the other probe 1012 is configured to operate within the second frequency band. The probes 1011, 1012 are enclosed by a supershaped lens 1013 which is supported by a ground plate (ground plane) 1014. The probes make part of coaxial connectors 1015, 1016 which are connected to a control circuit (not shown).

It will be apparent that the invention is not limited to the exemplary embodiments shown and described here, but that within the scope of the appended claims numerous variants are possible which will be self-evident to the skilled person in this field. In addition, it should be appreciated based on this disclosure that this invention has numerous embodiments including numerous inventive devices, components, aspects, methods, etc. In this document, references to the "the invention" are not intended to apply to all embodiments of the invention.

This summary is meant to provide an introduction to the concepts that are disclosed within the specification without being an exhaustive list of the many teachings and variations upon those teachings that are provided in the extended discussion within this disclosure. Thus, the contents of this summary should not be used to limit the scope of the claims that follow.

Inventive concepts are illustrated in a series of examples, some examples showing more than one inventive concept. Individual inventive concepts can be implemented without implementing all details provided in a particular example. It is not necessary to provide examples of every possible combination of the inventive concepts provide below as one of skill in the art will recognize that inventive concepts illustrated in various examples can be combined together in order to address a specific application.

Other systems, methods, features and advantages of the disclosed teachings will be or will become apparent to one with skill in the art upon examination of the following figures and detailed description. It is intended that all such additional systems, methods, features and advantages be included within the scope of and be protected by the accompanying claims.

The limitations in the claims (e.g., including that to be later added) are to be interpreted broadly based on the language employed in the claims and not limited to examples described in the present specification or during the prosecution of the application, which examples are to be construed as non-exclusive. For example, in the present disclosure, the term "preferably" is nonexclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" can be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments can include overlapping features. In this disclosure, the following abbreviated terminology can be employed: "e.g." which means "for example."

The invention claimed is:

1. An antenna, the antenna comprising:
   at least one electromagnetic lens,
   at least one ground plane connected to said lens, and
   at least one probing structure connected to said lens, said probing structure comprising at least two probes, wherein said probes are enclosed by the lens,
   wherein the mutual orientation of at least two probes is such that said probes are positioned at least partially out of the electromagnetic line of sight of each other, wherein the electromagnetic line of sight is interrupted, such that the probes do not see each other from an electromagnetic point of view.

2. The antenna according to claim 1, wherein between the probes at least one reflective element is positioned for reflecting electromagnetic radiation transmitted by at least one probe away from the at least one other probe.

3. The antenna according to claim 2, wherein the at least one reflective element is positioned such that a straight line between the probes is interrupted by the at least one reflective element.

4. The antenna according to claim 2 or 3, wherein at least one reflective element is formed by a circumferential wall of the lens.

5. The antenna according to claim 4, wherein at least a part of said circumferential wall of the lens has a concave shape.

6. The antenna according to claim 4, wherein at least a part of said circumferential wall is corrugated.

7. The antenna according to claim 1, wherein at least one antenna probe is positioned at or near to a sharp edge of the lens.

8. The antenna according to claim 1, wherein the probing structure is configured to receive electromagnetic radiation.

9. The antenna according to claim 1, wherein the probing structure is configured to transmit electromagnetic radiation.

10. The antenna according to claim 1, wherein the geometry of at least two probes is mutually different.

11. The antenna according to claim 1, wherein the at least one probe is at least partially enclosed by the lens.

12. The antenna according to claim 1, wherein at least one probe is configured to operate in the 5 GHz frequency band, wherein the length of said probe is between 4 and 8 mm.

13. The antenna according to claim 1, wherein at least one probe is configured to operate in the 2.4 GHz frequency band, wherein the length of said probe is between 10 and 18 mm.

14. The antenna according to claim 1, wherein the diameter of at least one probe is situated between 1 and 3 mm.

15. The antenna according to claim 1, wherein the lens is provided with at least one accommodating space for accommodating at least one probe of the probing structure.

16. The antenna according to claim 1, wherein the ground plane is provided with at least one accommodating space for accommodating at least one probe of the probing structure.

17. The antenna according to claim 1, wherein the antenna comprises multiple accommodating spaces, wherein each accommodating space is configured to accommodate a single probe.

18. The antenna according to claim 17, wherein the mutual orientation of at least two of the multiple accommodating spaces is such that said accommodating spaces are positioned out of the electromagnetic line of sight of each other.

19. The antenna according to claim 1, wherein the height of the lens is smaller than or equal to 5 cm.

20. The antenna according to claim 1, wherein the lens is at least partially made of a dielectric material.

21. The antenna according to claim 20, wherein the dielectric material has a dielectric constant of between 2 and 90.

22. The antenna according to claim 20, wherein the lens is at least partially made of at least one ceramic.

23. The antenna according to claim 20, wherein the lens is at least partially made of glass, crystal, and/or at least one polymer, in particular polyvinylchloride (PVC).

24. The antenna according to claim 23, wherein the lens comprises a shell which is at least partially made of at least one glass, crystal, and/or at least one polymer enclosing at least one inner space which is at least partially filled with a fluid, preferably air or demineralised water.

25. The antenna according to claim 1, wherein the lens is a dielectric resonator.

26. The antenna according to claim 1, wherein at least one of the at least one electromagnetic lens and the at least one ground plane having at least one base profile is substantially supershaped, wherein said supershaped base profile is defined by the polar function:

$$\rho_d(\varphi) = \frac{1}{\sqrt[n_1]{\left|\frac{1}{a}\cos\frac{m_1}{4}\varphi\right|^{n_2} + /-\left|\frac{1}{b}\sin\frac{m_2}{4}\varphi\right|^{n_3}}}$$

a, b $\in \mathbb{R}^+$; $m_1$, $m_2$, $n_1$, $n_2$, $n_3 \in \mathbb{R}$, a, b, $n_1 \neq 0$
and wherein:
   $\rho_d(\varphi)$ is a curve located in the XY-plane, and
   $\varphi \in [0, 2\pi)$ is the angular coordinate.

27. The antenna according to claim 26, wherein the parametric representation of the three-dimensional shape of the lens and/or the ground plane is based on two perpendicular cross sections $\rho_1(\theta)$ and $\rho_2(\varphi)$:

$$\begin{bmatrix} x = \rho_1(\vartheta)\cos\vartheta \cdot \rho_2(\varphi)\cos\varphi \\ y = \rho_1(\vartheta)\sin\vartheta \cdot \rho_2(\varphi)\cos\varphi \\ z = \rho_2(\varphi)\sin\varphi \end{bmatrix}$$

wherein:
   $\rho$ is defined by the function presented in claims 1,
   $0 \leq \theta \leq 2\pi$, and
   $-\frac{1}{2}\pi \leq \varphi \leq \frac{1}{2}\pi$.

28. The antenna according to claim 26, wherein $m \geq 4$.

29. The antenna according to claim 26, wherein $a \neq b$.

30. The antenna according to claim 26, wherein at least one value of $n_x$, $n_y$, and $n_0$ deviates from 2.

31. The antenna according to claim 26, wherein the substantially supershaped base profile is a base profile of the lens which extends in a direction which is substantially parallel to a plane defined by the ground plane.

32. The antenna according to claim 1, wherein the lens and/or the ground plane is substantially prism shaped.

33. The antenna according to claim 1, wherein a surface of the ground plane directed towards the lens is at least partially reflective.

34. The antenna according to claim 1, wherein the ground plane is at least partially made of an electrically conductive material.

35. The antenna according to claim 1, wherein the probing structure is connected to the ground plane.

36. The antenna according to claim 1, wherein the lens has a refractive index n, wherein n≠1.

37. The antenna according to claim 1, wherein the probing structure comprises at least one first probe configured to communicate in a first frequency band, and at least one second probe configured to communicate in a second frequency band.

38. The antenna according to claim 37, wherein the probing structure comprises multiple first probes and multiple second probes.

39. The antenna according to claim 1, wherein the antenna comprises at least one processor to automatically switch the probing structure between a radiation transmitting mode and a radiation receiving mode for two-way communication of the probing structure.

40. The antenna according to claim 37, wherein the processor is configured to automatically switch between the first frequency band and the second frequency band for two-way communication in each frequency band.

41. The antenna according to claim 1, wherein the mutual orientation of all probes is such that all probes are positioned at least partially out of the electromagnetic line of sight of each other.

42. An antenna system for transmitting and receiving electromagnetic signals, the system comprising at least one antenna according to claim 1.

43. The antenna system according to claim 42, wherein the antenna system comprises a plurality of MIMO-configured antennas according to claim 37.

44. The antenna system according to claim 43, wherein the system comprises at least two dual-band antennas, and at least one processor for switching in at least one of the two frequency bands, so ensuring diversity of reception and transmission of the signals in this band.

45. The antenna system according to claim 44, wherein the switching means is a DPDT switch or SPDT switch.

46. The antenna system according to claim 44, comprising at least one interface means for programming the at least one processor.

47. A method of manufacturing an antenna according to claim 1, comprising the step of assembling the ground plane, the lens, and the probing structure, said probing structure comprising multiple probes, wherein the mutual orientation of at least two probes is such that said probes are positioned at least partially out of the electromagnetic line of sight of each other.

48. The method according to claim 47, wherein at least one ground plane and/or at least one lens is designed such that the ground plane and/or the lens has at least one base profile which is substantially supershaped, said supershape defined by the polar function:

$$\rho_d(\varphi) = \frac{1}{\sqrt[n_1]{\left|\frac{1}{a}\cos\frac{m_1}{4}\varphi\right|^{n_2} + \left/\left|-\frac{1}{b}\sin\frac{m_2}{4}\varphi\right|^{n_3}\right.}}$$

$a, b \in \mathbb{R}^+$; $m_1, m_2, n_1, n_2, n_3 \in \mathbb{R}$, $a, b, n_1 \neq 0$
and wherein:
$\rho_d(\phi)$ is a curve located in the XY-plane; and
$\phi \in [0, 2\pi)$ is the angular coordinate.

49. The method according to claim 47, wherein during assembling multiple probes are connected to the ground plane and/or the lens.

50. The method according to claim 49, wherein at least one probe is configured to communicate in a first frequency band and at least one other probe is configured to communicate in a second frequency band.

51. The method according to claim 50, wherein the different probes are oriented such that, during operation, different sectors of the lens will be excited.

52. The method according to claim 47, wherein the lens is at least partially made of a dielectric material chosen from the group consisting of: crystal, glass, ceramics, polymer, and demineralised water.

53. The method according to claim 52, wherein the polymeric lens is made by 3D printing.

54. A method for use in wireless communications by using an antenna according to claim 1, the method comprising the step of connecting a communication circuit to an antenna network, the network comprising a plurality of antennas according to claim 1, each antenna optimized for operation in at least one designated frequency band.

55. The method according to claim 54, wherein the communication circuit comprises a transmitter.

56. The method according to claim 54, wherein the communication circuit comprises a receiver.

57. The method according to claim 54, wherein the communication circuit comprises a transceiver.

58. The method according to claim 54, wherein each antenna is optimized for operation in multiple frequency bands.

59. The method according to claim 54, wherein each of the plurality of designated frequency bands comprises a single frequency.

60. The method according to claim 54, wherein the plurality of antennas are connected in parallel.

61. The method according to claim 54, wherein the plurality of antennas are connected in series.

62. A lens as used in an antenna according to claim 1.

63. A ground plane as used in an antenna according to claim 1.

64. A RF transceiver of a wireless communications device comprising at least one antenna according to claim 1.

65. An electronic device comprising an RF transceiver according to claim 64.

* * * * *

UNITED STATES PATENT AND TRADEMARK OFFICE
CERTIFICATE OF CORRECTION

PATENT NO. : 9,716,319 B2  
APPLICATION NO. : 14/429731  
DATED : July 25, 2017  
INVENTOR(S) : Caratelli et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 172 days.

Signed and Sealed this  
Twenty-first Day of November, 2017

Joseph Matal  
*Performing the Functions and Duties of the*  
*Under Secretary of Commerce for Intellectual Property and*  
*Director of the United States Patent and Trademark Office*